United States Patent
Ueki

(10) Patent No.: US 6,496,456 B2
(45) Date of Patent: Dec. 17, 2002

(54) POWER SAVING SYSTEM FOR OPTICAL DISC RECORDING/REPRODUCING APPARATUS

(75) Inventor: Yasuhiro Ueki, Sagamihara (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/969,628

(22) Filed: Oct. 4, 2001

(65) Prior Publication Data

US 2002/0018410 A1 Feb. 14, 2002

Related U.S. Application Data

(62) Division of application No. 09/290,393, filed on Apr. 13, 1999, now Pat. No. 6,310,848.

(30) Foreign Application Priority Data

| Apr. 21, 1998 | (JP) | 10-126906 |
| Apr. 27, 1998 | (JP) | 10-116319 |
| Jul. 29, 1998 | (JP) | 10-228592 |
| Jul. 29, 1998 | (JP) | 10-228593 |

(51) Int. Cl.$^7$ ................................................ G11B 7/00
(52) U.S. Cl. .................................................. 369/47.33
(58) Field of Search .......................... 369/116, 47.29, 369/47.18, 47.3, 47.33, 47.42, 53.18, 47.52, 44.32

(56) References Cited

U.S. PATENT DOCUMENTS

| 5,625,615 A | * | 4/1997 | Dente et al. ................. 369/116 |
| 5,799,197 A |   | 8/1998 | Juso et al. |
| 6,269,061 B1 | * | 7/2001 | Shimizume et al. ..... 369/47.33 |

FOREIGN PATENT DOCUMENTS

| JP | 3-148921 | * | 6/1991 | ............ 369/53.37 |
| JP | 5-342585 |   | 12/1993 | |
| JP | 8-273304 |   | 10/1996 | |
| JP | 8-336103 |   | 12/1996 | |
| JP | 8-336104 |   | 12/1996 | |
| JP | 8-339637 |   | 12/1996 | |
| JP | 8-339663 |   | 12/1996 | |
| JP | 9-17161 |   | 1/1997 | |

* cited by examiner

Primary Examiner—Nabil Hindi
(74) Attorney, Agent, or Firm—Connolly Bove Lodge & Hutz LLP

(57) ABSTRACT

A power saving system of an optical recording/reproducing apparatus is provided. The optical recording/reproducing apparatus includes a temporal memory which stores reproduced data or recording data in a cyclic data storage stage and from which the stored data is read out for reproduction or recording in a cyclic data readout stage following the data storage stage. The power saving system saves part of power consumed in the apparatus in the data storage stage in a record mode of operation and in the data readout stage in a reproduce mode of operation.

3 Claims, 20 Drawing Sheets

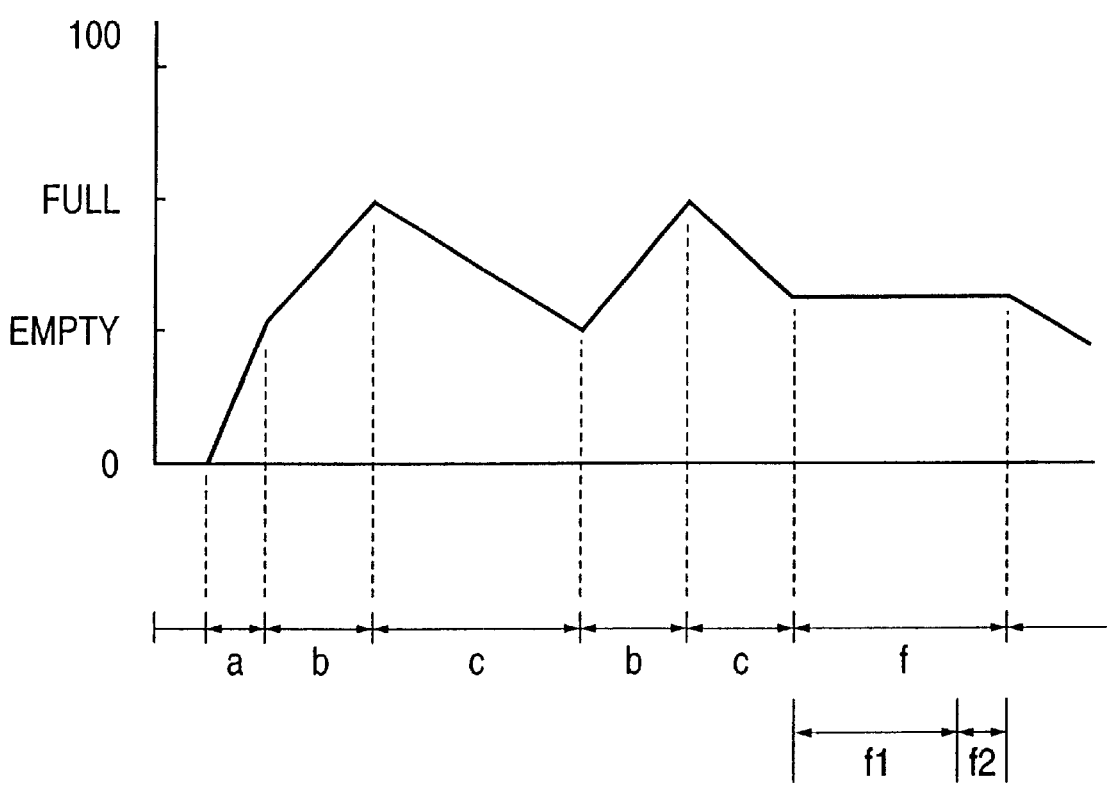

POWER SAVING SYSTEM FOR OPTICAL DISC RECORDING/REPRODUCING APPARATUS

CROSS REFERENCE TO RELATED APPLICATION

The present application is a divisional of U.S. patent application Ser. No. 09/290,393, filed Apr. 13, 1999, now allowed. Now U.S. Pat. No. 6,310,848.

BACKGROUND OF THE INVENTION

1. Technical Field of the Invention

The present invention relates generally to a power saving system for a recording/reproducing apparatus designed to record or reproduce information on or from optical discs such as MDs (Mini Discs), MD2s, video CDs (Compact Discs), high-quality CDs, CD-Rs, CD-RWs, DVDs (Digital Versatile Discs), DVD-ROMs, DVD-Rs, DVD-RAMs, DVD-RWs, DVD+RWs, and MO (Magneto-Optical) discs, and more particularly to a power saving system for an optical disc recording/reproducing apparatus having a temporary memory for storing the data for data compression or decompression or shock-proofing.

2. Background Art

Recently, various types of portable recording/reproducing apparatus using an optical disc such as a CD, a DVD, or a MD appear on the market.

Usually, such portable recording/reproducing apparatuses have a shock-proof memory. For instance, MD portable players have a shock-proof memory of a capacity of about 4 Mbit and, in the playback mode of operation, holds the information content equivalent to a playback time of about 10 sec. in the memory temporarily, while kicking a pickup cyclically between adjacent track turns until one of sectors on which information is to be recorded next. In a record mode, after audio signals are compressed and stored in the shock-proof memory, they are read out of the memory and recorded on a MD for a preselected period of time. A sequence of these operations is carried out cyclically to record all audio signals on the MD. During a time interval between cyclic recordings of the audio signals on the MD, the pickup is kept kicked to track one of track turns for waiting one of sectors on which audio signals are to be recorded next.

Such portable players are required to record or reproduce data for an increased period of time. To this end, it is necessary to prolong the service lift of a battery, or to save as much of power consumed in the player as possible.

SUMMARY OF THE INVENTION

It is therefore a principal object of the present invention to avoid the disadvantages of the prior art.

It is another object of the present invention to provide a recording/reproducing apparatus having a power saving system for prolonging the record or playback time.

According to one aspect of the invention, there is provided an optical recording apparatus. The optical recording apparatus comprises: (a) a temporal memory which stores therein a signal to be recorded on an optical disc which is compressed at a given compression rate; (b) a data storage monitoring circuit which monitors the amount of the compressed signal stored in the temporal memory and provides a signal indicative thereof; (c) a pickup which emits light onto the optical disc to record the compressed signal read out of the temporal memory and receives a return of the light from the optical disc to output a signal; (d) a first servo circuit which produces servo error signals based on the signal outputted from the pickup; (e) a second servo circuit which is responsive to the servo error signals from the first servo circuit to subject the pickup to focus, tracking, and traverse control; and (f) a power saving circuit which is responsive to the signal from the data storage monitoring circuit to save power supplied to a preselected circuit component of at least one of the first and second servo circuit during a time interval in which the amount of the compressed signal stored in the temporal increases from a first level to a second level.

In the preferred mode of the invention, a compression rate determining circuit is further provided which determines the compression rate of the signal to be recorded on the optical disc. The power saving circuit determines the second level based on the compression rate.

The power saving circuit resumes the supply of power to the preselected circuit component after the amount of the compressed signal stored in the temporal reaches the second level.

A signal type specifying circuit may be provided which specifies a type of the signal to be recorded on the optical disc. The power saving circuit performs a power saving operation based on the type of the signal specified by the signal type specifying circuit and determines a timing with which the supply of power to the preselected circuit component is resumed based on the type of the signal.

A disc type specifying circuit may be provided which specifies a type of the optical disc. The power saving circuit performs the power saving operation based on the type of the signal specified by the signal type specifying circuit and the type of the optical disc specified by the disc type specifying circuit and determines the timing with which the supply of power to the preselected circuit component is resumed based on the type of the signal and the type of the optical disc.

A linear velocity determining circuit may also be provided which determines a linear velocity of the optical disc based on the type of the signal. The power saving circuit performs the power saving operation and determines the timing with which the supply of power to the preselected circuit component is resumed based on the type of the signal and the linear velocity of the optical disc.

According to the second aspect of the invention, there is provided an optical reproducing apparatus. The optical reproducing apparatus comprises: (a) an error correcting circuit which subjects data reproduced from an optical disc to error correction; (b) a temporal memory which stores the data corrected in error by the error correcting circuit in a data storage stage; (c) a data storage monitoring circuit which monitors the amount of the data stored in the temporal memory and provides a signal indicative thereof; (d) a reproducing circuit which reads the data out of the temporal memory in a data readout stage following the data storage stage and outputs the data for reproduction; and (e) a power saving circuit which is responsive to the signal from the data storage monitoring circuit to save power supplied to at least the error correcting circuit during a time interval in which the amount of the data stored in the temporal decreases from a first level to a second level in the data readout stage.

In the preferred mode of the invention, the apparatus further comprises a pickup which optically picks up the data from the optical disc, a driver which drives the pickup under servo control, a playback/servo circuit which produces a data signal and a servo error signal from the data picked up by the pickup, provides the servo error signal to the driver for use in the servo control of the pickup, and holds the data signal in the temporal memory, and a tracking circuit which subjects the pickup to tracking control. The reproducing circuit reads the data signal out of the temporal memory and decompresses the data signal. The power saving circuit saves the power supplied to at least the error correcting circuit and the tracking circuit during the time interval in which the amount of the data stored in the temporal decreases from the first level to the second level in the data readout stage.

According to the third aspect of the invention, there is provided an optical reproducing apparatus. The optical reproducing apparatus comprises: (a) a first control circuit which controls rotation of an optical disc in a first servo control mode based on a speed control signal derived from a drive circuit rotating the optical disc; (b) a second control circuit which controls rotation of the optical disc in a second servo control mode based on a speed control signal derived from data reproduced from the optical disc; (c) a driver circuit which drives a pickup reading the data out of the optical disc; (d) a playback/servo circuit which produces a data signal for playback and a servo error signal from on the data picked up by the pickup; (e) a focus control circuit which subjects the pickup to focus control; (f) a tracking control circuit which subjects the pickup to tracking control; (g) an error correcting circuit which subjects the data read out by the pickup to error correction; (h) a temporal memory which stores the data corrected in error by the error correcting circuit in a data storage stage; (i) a data storage monitoring circuit which monitors the amount of the data stored in the temporal memory and provides a signal indicative thereof; (j) a reproducing circuit which reads the data out of the temporal memory in a data readout stage following the data storage stage and outputs the data for reproduction; and (k) a controlling circuit which is responsive to the signal from the data storage monitoring circuit to save power supplied to at least the error correcting circuit during a time interval in which the amount of the data stored in the temporal decreases from a first level to a second level in the data readout stage. The controlling circuit switches control of the rotation of the optical disc from the second servo control mode to the first servo control mode.

According to the fourth aspect of the invention, there is provided an optical reproducing apparatus. The optical reproducing apparatus comprises: (a) a driver circuit which drives a pickup reading data out of the optical disc; (b) a playback/servo circuit which produces a data signal for playback and a servo error signal from on the data picked up by the pickup; (c) a servo circuit which provides a servo signal to the driver circuit based on the servo error signal from the playback/servo circuit; (d) an error correcting circuit which subjects the data read out by the pickup to error correction; (e) a temporal memory which stores the data corrected in error by the error correcting circuit in a data storage stage; (f) a data storage monitoring circuit which monitors the amount of the data stored in the temporal memory and provides a signal indicative thereof; (g) a reproducing circuit which reads the data out of the temporal memory in a data readout stage following the data storage stage and outputs the data for reproduction; and (h) a power saving circuit which is responsive to the signal from the data storage monitoring circuit to save power supplied to at least one of the drive circuit, the playback/servo circuit, and the error correcting circuit during a time interval in which the amount of the data stored in the temporal decreases from a first level to a second level in the data readout stage.

In the preferred mode of the invention, a transfer rate detector is further provided which detects a transfer rate of the data picked up from the optical disc. The power saving circuit performs a power saving operation based on the transfer rate of the data detected by the transfer rate detector and determines a timing with which supply of power is resumed based on the transfer rate.

A signal type specifying circuit may be provided which specifies a type of the data signal reproduced from the optical disc. The power saving circuit performs a power saving operation based on the type of the data signal specified by the signal type specifying circuit and determines a timing with which the supply of power is resumed based on the type of the signal.

A disc type specifying circuit may be provided which specifies a type of the optical disc. The power saving circuit performs a power saving operation based on the type of the optical disc specified by the disc type specifying circuit and determines a timing with which supply of the power is resumed based on the type of the optical disc.

A linear velocity determining circuit may also be provided which determines a linear velocity of the optical disc based on the type of the signal. The power saving circuit performs the power saving operation and determines the timing with which the supply of power is resumed based on the type of the signal and the linear velocity of the optical disc.

According to the fifth aspect of the invention, there is provided an optical reproducing apparatus. The optical reproducing apparatus comprises: (a) a pickup reading data out of an optical disc optically; (b) a signal producing circuit producing a reproduction signal containing control data and a servo circuit from the data read out by the pickup; (c) a servo circuit responsive to the servo signal to control readout of the data through the pickup; (d) a temporal memory storing therein the reproduction signal containing the control data; (e) a reproducing circuit reproducing the reproduction signal based on the control data; and (f) a power saving circuit saving a portion of power consumed in the apparatus during a reproduce mode of operation of the reproducing circuit.

According to the sixth aspect of the invention, there is provided an optical reproducing apparatus. The optical reproducing apparatus comprises: (a) a pickup reading data out of an optical disc optically; (b) a signal producing circuit producing a reproduction signal containing control data and a servo circuit from the data read out by the pickup; (c) a servo circuit responsive to the servo signal to control readout of the data through the pickup; (d) a temporal memory storing therein the reproduction signal containing the control data; (e) a reproducing circuit reproducing the reproduction signal based on the control data; (f) a first control circuit which controls rotation of an optical disc in a first servo control mode based on a speed control signal derived from a motor rotating the optical disc; (g) a second control circuit which controls rotation of the optical disc in a second servo control mode based on a speed control signal derived from the data reproduced from the optical disc; and (h) a power saving circuit saving a portion of power consumed in the apparatus during a reproduce mode of operation of the reproducing circuit, the power saving circuit switching control of the rotation of the optical disc from the second servo control mode to the first servo control mode.

In the preferred mode of the invention, the power saving circuit selects one of a plurality of power save operation modes based on a controlled content of the control data.

The power saving circuit may determine a power save duration based on a controlled content of the control data.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 21 is a time chart which shows a variation in amount of data stored in a temporal memory in a modification of the tenth embodiment.

DESCRIPTION OF THE PREFERRED EMBODIMENTS

Figure 1:
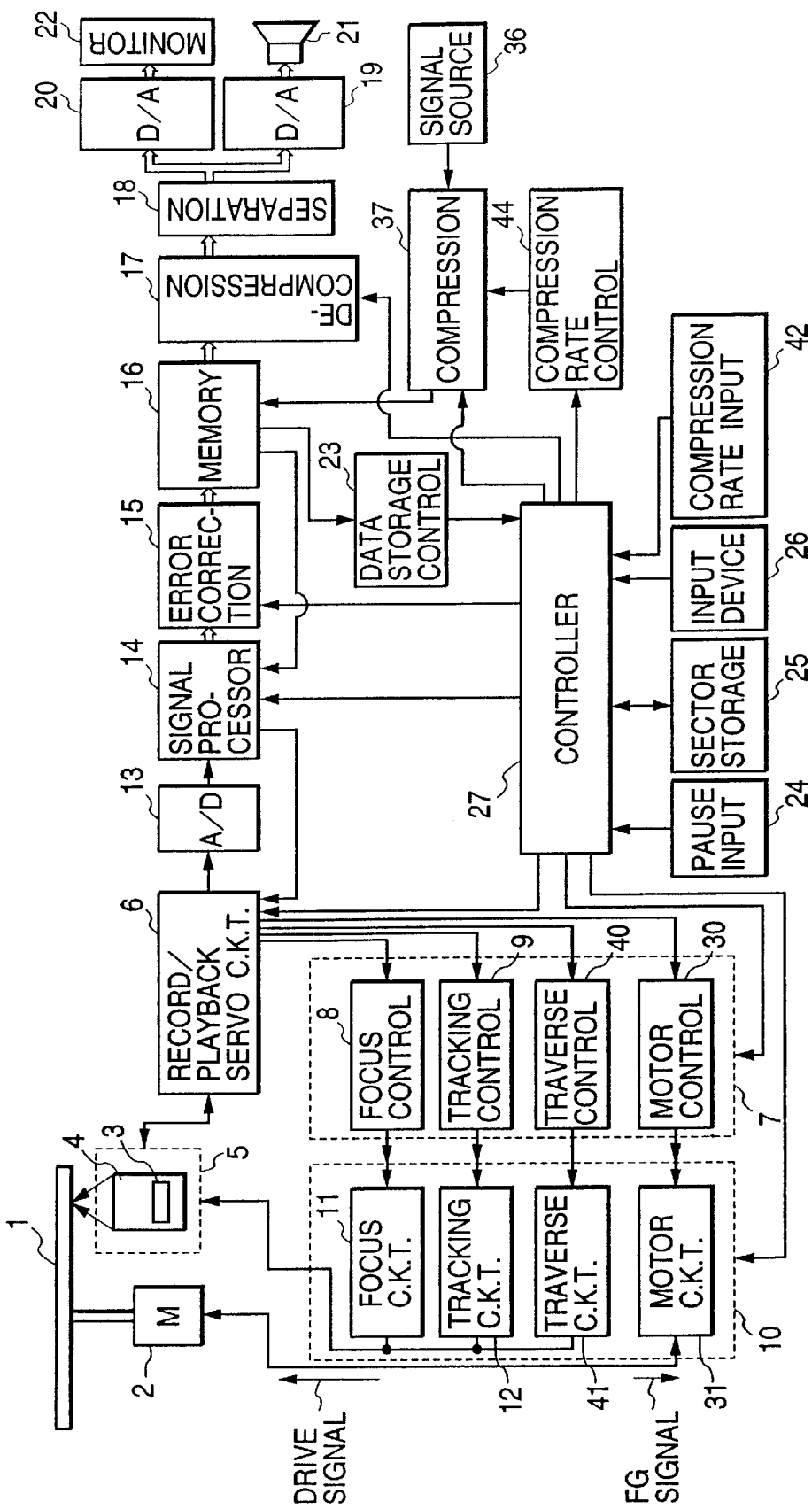
FIG. 1 is a block diagram which shows an optical recording/reproducing apparatus having a power save function according to the first embodiment of the invention.

Referring now to the drawings, wherein like numbers refer to like parts in several views, particularly to FIG. 1, there is shown a recording/reproducing apparatus for optical discs which has a power saving system used in a record mode of operation.

Figure 2:
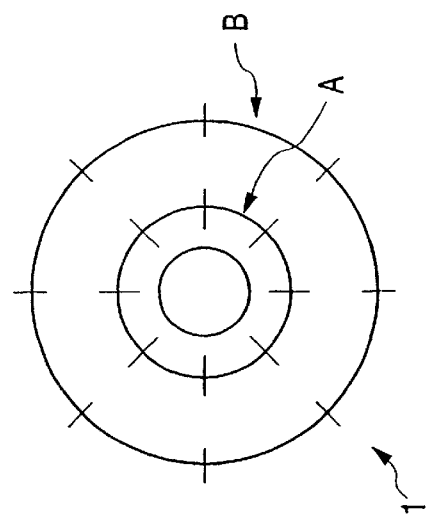
FIG. 2 is an illustration which shows an optical disc on which track turns consisting of sectors are formed.

The optical disc 1 has concentric tracks or a spiral track formed on a surface thereof. FIG. 2 shows, as one example, two track tuns A and B formed on the optical disc 1 which have different diameters. It is assumed that the optical disc 1 is controlled to be rotated at a CLV (Constant Linear Velocity), the inner track turn A has four sectors, and the outer track turn B has eight sectors. The time for a complete turn of the disc 1 is 40 msec. when a pickup, as will be described later, lies on the inner track turn A and 80 msec. when the pickup lies on the outer track turn B.

Referring back to FIG. 1, the recording/reproducing apparatus generally includes a spindle motor 2, a laser 3, a pickup 4, a record/playback servo circuit 6, a second servo circuit 7, and a driver 10.

The spindle motor 2 is driven under the servo control to spin the optical disc 1. The laser 3 emits a laser beam for recording or reproducing information on or from the optical disc 1. The pickup 4 picks up a laser return from the optical disc 1. The pickup 4 has the laser 3 installed therein and is moved in unison by a moving mechanism 5 in a radius direction of the optical disc 1. The record/playback servo circuit 6 receives outputs from the pickup 4 and outputs a signal reproduced from the optical disc 1, servo signals, and a speed control signal for the CLV control. The record/playback servo circuit 6 includes a focus error signal generator, a tracking error signal generator, a reproduced signal generator, an equalizer, a PLL, a speed control signal generator, and a laser power controller such as an automatic power controller (APC). The second servo circuit 7 includes a focus controller 8, a tracking controller 9, a traverse controller 40, and a spindle motor controller 30. The driver 10 operates the pickup 4 and the spindle motor 2 and includes a focus circuit 11, a tracking circuit 12, a traversing circuit 41, and a spindle motor circuit 31.

The recording/reproducing apparatus also includes an A/D converter 13, a signal processor 14, an error correction circuit 15, a temporal memory 16, a decompressing circuit 17, a separation circuit 18, a D/A converters 19 and 20, a speaker 21, and a monitor 22.

The A/D converter 13 converts a reproduced signal in a digital form inputted from the record/playback servo circuit 6 into an analog signal. The signal processor 14 decodes the reproduced signal, e.g., an EFM(Eight to Fourteen Modulation)+signal, into NRZ data. The error correction circuit 15 corrects errors contained in the decoded signal outputted from the signal processor 14. The error-corrected decoded signal is a signal compressed at a variable transfer rate. The temporal memory 16 is, for example, a DRAM with a capacity of about 16 Mb and stores therein the compressed data outputted from the error correction circuit 15 to absorb a variation in transfer rate. In the record mode of operation, the temporal memory 16 also serves to hold compressed data to be recorded on the optical disc 1. The decompressing circuit 17 consists of, for example, an A-V (audio-video) decoder which decompresses the data read out of the temporal memory 16. The separation circuit 18 separates the decompressed data into audio and video signals, for example, and supplies them to the D/A converters 19 and 20, respectively. The D/A converter 19 converts the video signal in a digital form into an analog video signal and supplies it to the monitor 22. The D/A converter 20 converts the audio signal in a digital form into an analog audio signal and supplies it to the speaker 21.

The recording/reproducing apparatus also includes a data storage control circuit 23, a controller 27, a pause input device 24, a sector storage 25, and an input device 26.

The data storage control circuit 23 controls the quantity of data held in the temporal memory 16 and provides a data quantity control signal indicative of a controlled quantity of the data to the controller 27. The pause input device 24 may consist of an external device or a key for inputting a pause signal to stop a playback operation of the apparatus. The sector storage 25 holds therein a sector number or address of one of sectors of the optical disc 1 from or on which data is to be reproduced or recorded next. The input device 26 is used by an operator to input desired instructions into the controller 27. The controller 27 is made up of a microcomputer which controls the whole operation of the apparatus. Signal flows only during the playback mode of operation are indicated by white thick arrows.

A recording system of the recording/reproducing apparatus generally includes a recording signal source 36, a compressing circuit 37, a compression rate input circuit 42, and a compression rate control circuit 44.

The recording signal source 36 outputs recording signals in a digital form to be recorded on the optical disc 1 and may be implemented with a microphone, a video recorder which inputs audio and video signals to the apparatus, or other similar devices. The compressing circuit 37 codes the recording signals inputted from the recording signal source 36, for example, in the MPEG-2 format. The compressed signals outputted from the compressing circuit 37 are stored in the temporal memory 16 and then supplied to the signal processor 14. The signal processor 14 adds codes such as addresses and sync signals to the compressed signals read out of the temporal memory 16 and supplies them as recording data to the record/playback servo circuit 6. The record/playback servo circuit 6 outputs the recording data intermittently to the pickup 4 and modulates, for example, laser beams emitted from the laser 3 to write the recording data on the optical disc 1.

The compression rate input circuit 42 is designed to manually input a record mode switch instruction to select the recording time in the record mode of operation among, for example, two hours, four hours, and six hours and to determine the compression rate as a function of the recording time.

The compression rate control circuit 44 controls the compressing circuit 37 to compress the recording signals from the recording signal source 36 at a rate selected by the compression rate input circuit 42.

In the playback mode of operation, a signal reproduced from the optical disc 1 by the pickup 4 is inputted to the record/playback servo circuit 6. The record/playback servo circuit 6 produces servo signals, and a speed control signal. The servo signals are inputted to the second servo circuit 7. The focus controller 8 is responsive to the servo signal to produce a focus drive signal. The tracking controller 9 is responsive to the servo signal to produce a tracking drive signal. Similarly the traverse controller 40 is responsive to the servo signal to produce a traverse drive signal. The spindle motor controller 30 is responsive to the speed control signal to produce a drive signal. The focus drive signal, the tracking drive signal, the traverse drive signal, and the drive signal are inputted to the driver 10 to perform the so-called focus, tracking, and traversing control of the pickup 4 through the focus circuit 11, the tracking circuit 12, and the traversing circuit 41.

In practice, the speed control signal is produced by a PLL built in the record/playback servo circuit 6 and sent to the spindle motor controller 30 of the second servo circuit 7 to produce the drive signal. The drive signal is supplied to the spindle motor circuit 31. The spindle motor circuit 31 produces a drive control signal to regulate the speed of the spindle motor 2 under the CLV control. The spindle motor 2 produces an angular position signal through a Hall element (not shown) which is fed back to the second servo circuit 7 to produce a speed control signal which is used as needed in the FG (Frequency Generator) control to maintain the speed of the spindle motor 2 constant.

The reproduced signal outputted from the pickup 4 is optimized in frequency characteristics by an equalizer installed in the record/playback servo circuit 6 and inputted to the PLL. The reproduced signal is converted by the A/D converter 13 into a digital signal and then inputted to the signal processor 14. The signal processor 14 subjects the digital signal to the synchronous detection so as to decode the EFM+signal recorded on the optical disc 1 to produce the NRZ data. The NRZ data is inputted to the error correction circuit 15. The error correction circuit 15 has the NRZ data undergo the error correction and derives an address signal for a sector and a data signal. The data signal is a signal compressed at a variable transfer rate and thus held in the temporal memory 16 for absorbing a variation in transfer rate.

The signal read out of the temporal memory 16 is decompressed by the decompressing circuit 17 which consists of the A-V decoder and then split by the separation circuit 18 into audio and video signals. The audio signal is supplied to the speaker 21 through the D/A converter 19. The video signal is supplied to the motor 22 through the D/A converter 20.

In the record mode of operation, if audio and video signals produced from the recording signal source 36 are digital signals, they are inputted directly to the compressing circuit 37. Alternatively, if analog signals, they are first converted by an A/D converter (not, shown) into digital signals and then inputted to the compressing circuit 37. The compressing circuit 37 codes and compresses the input signals which are, in turn, stored in the temporal memory 16, as indicated by "a" in a time chart of FIG. 3. For instance, if the input signals to the compressing circuit 37 are video signals, they are decoded into NTSC signals and compressed in the MPEG-2 format. Alternatively, if audio signals, they are compressed by an A-V encoder in the AC-3 format. The amount of data stored in the temporal memory 16 are always monitored by the data storage control circuit 23. When a stored amount of data in the temporal memory 16 reaches a full level, the data are read out of the temporal memory 16, as indicated by "b" in FIG. 3, and supplied to the signal processor 14. The signal processor 14 adds error correction codes, address codes, and sync signals to the input data which are, in turn, written in the optical disc 1 through the pickup 4. During the readout of data from the temporal memory 16, following recording signals compressed by the compressing circuit 37 are stored in the temporal memory 16. Note that the data readout speed is higher than the data write speed.

When the temporal memory 16 becomes empty, typical systems prohibit the data from being read out of the temporal memory 16 and written in the optical disc 1, kick the pickup 4 cyclically to trace one of track turns on which the data is to be recorded next in a standby mode, however, the controller 27 of this embodiment. as will be described later in detail, prohibits the readout of the data from the temporal memory 16 until a stored amount of data in the temporal memory 16 reaches a given level. During the prohibition of the readout of data, compressed data from the compressing circuit 37 continues, as indicated by "c" in FIG. 3, to be stored in the temporal memory 16. When the temporal memory 16 becomes full again, the data, as indicated by "d", begins to be read out of the temporal memory 16 and written in the optical disc 1 until a stored amount of data in the temporal memory 16 reaches the empty level. Subsequently, the same steps are repeated to write data on the optical disc 1 cyclically.

Within each of the data storage stages "a", "c", "e", and "g" where the amount of data stored in the temporal memory 16 is increased, the recording/reproducing apparatus is in a power save mode to minimize the power consumption until the stored amount of data reaches a reference level slightly lower than the full level. During the power save mode, the supply of power to at least part of either or both of the record/playback servo circuit 6 and the second servo circuit 7 is cut to reduce the total power consumption of the apparatus. For instance, the supply of power to the tracking control is cut while keeping the supply of power to the focus control. Alternatively, the supply of power to the record/playback servo circuit 6, the laser 3, and the second servo circuit 7 is cut while rotating the optical disc 1.

Figure 3:
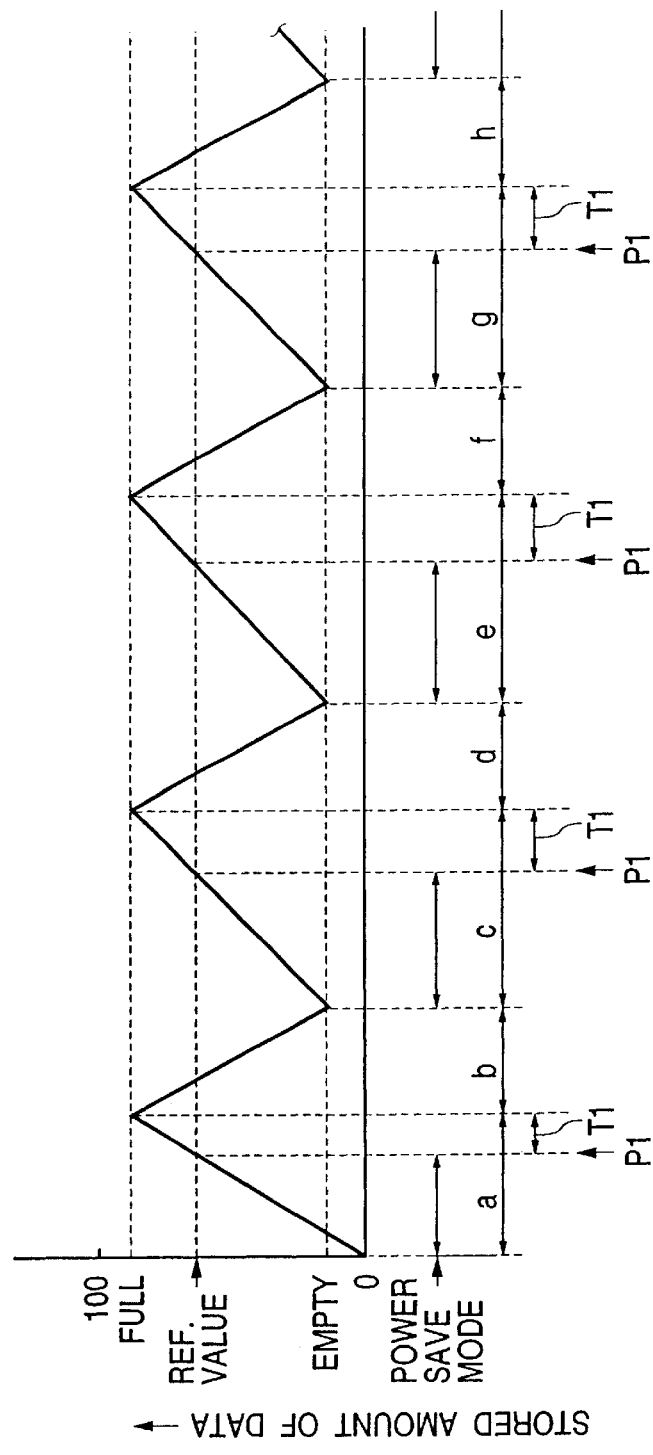
FIG. 3 is a time chart which shows a variation in amount of data stored in a temporal memory.

When the amount of data stored in the temporal memory 16 reaches the reference level at p1 in FIG. 3, the controller 27 switches the power save mode to a normal power supply mode. The controller 27 moves the pickup 4 to a subsequent track and enters the standby mode. When the stored amount of data in the temporal memory 16 reaches the full level, the controller 27 activates the pickup 4 to start writing data on the optical disc 1. When the temporal memory 16 becomes empty, the controller 27 prohibits the writing of data on the optical disc 1 and at the same time, enters the power save mode again.

The time T1 required for the amount of data stored in the temporal memory 16 to reach the full level from P1 is determined, allowing for the time required for a system to which the-supply of power is cut in the power save mode to return to the normal operation mode. In this embodiment, the time T1 is approximately 100 msec. The time T1, will be discussed later in detail, depends upon the compression rate of data in the record mode of operation and the duration of the power save mode.

The switching of the compression rate of data used in the compressing circuit 37 is achieved by manually selecting one of data recording modes through the compression rate input circuit 42 to send a compression rate switching signal to the compressing circuit 37 through the compression rate control circuit 44 or may alternatively be achieved by automatically selecting one of the compression rates in the controller 27 according to the type of signals outputted from the recording signal source 36.

The data recording modes are of, for example, three types: two-hour mode, four-hour mode, and six-hour mode. In the two-hour mode, a total recording time is approximately two hours to ensure a high quality of images. In the four-hour mode, a total recording time is approximately four hours to keep a normal quality of images. In the six-hour mode, a total recording time is approximately six hours, but resulting in a deterioration in quality of images. Further, the compression rate input circuit 42 may have manual keys used to change the data recording mode through an internal switch when it is required to change the definition of images, when a high speed scene such as a car race is recorded, or when it is required to select the recording time rather than the quality of images or have a control circuit receiving control data inputted from an external device to change the data recording mode. When a desired one of the data recording modes is selected, the duty of the pickup 4, that is, a ratio of a data write period during which the pickup 4 writes data on the optical disc 1 to a rest period during which the pickup 4 waits for next recording, in other words, a transfer rate ratio of data to be recorded on the optical disc 1 to data compressed by the compressing circuit 37 is determined. The power save mode may, thus, be determined as a function of the duty of the pickup 4 or the compression rate of data to be recorded, as will be described later.

Further, the power save mode may be determined by an operator through a manual switch according to the degree of priority to increase in service life of a battery over protection of data against vibration or shock, or vice versa.

The temporal memory 16 has, as described above, a capacity of 16 Mb. Thus, for instance, when it is required to record image data at 8 Mbps in the two-hour mode, it allows the temporal memory 16 to hold the image data for 2 sec. If 100 msec. is required for the apparatus to return to the normal operation mode following the termination of the power save mode, then the amount of image data stored in the temporal memory 16 in 100 msec. is calculated in the following manner. If the empty level is defined as zero (0) Mb, and the full level is defined as 16 Mb, a ratio of the time required for the apparatus to return to the normal operation mode following the termination of the power save mode to the time required for the temporal memory 16 to reach the full level from the empty level is 100 msec./2 sec.=0.05. The amount of image data stored in the temporal memory 16 in 100 m sec. is, thus, 16 Mb×0.05=0.8 Mb. Therefore, the controller 27 may terminate the power saving operation when the amount of image data stored in the temporal memory 16 becomes at least 15.2 Mb (=16 Mb–0.8 Mb). Therefore, the controller 27 may terminates the power saving operation when the amount of image data stored in the temporal memory 16 becomes at least 15.2 Mb (=16 Mb–0.8 Mb).

Note that the full level and the empty level of the amount of data stored in the temporal memory 16, as referred to this disclosure, do not indicate data stored amounts of 100% and 0%, respectively, but values to which preselected margins are added. The time required for the apparatus to return to the normal operation mode following the termination of the power save mode depends upon the type of power save mode, as will be discussed later in detail, and is preferably determined as function of the position of a current track turn on the optical disc 1. This is because the time required for the apparatus to return to the normal power save mode should include the waiting time of the pickup 4 until one of sectors on the optical disc 1 on which data is to be recorded next reaches the pickup 4, and the waiting time becomes short when the pickup 4 is tracing an inner one of the track turns, while it becomes long when the pickup 4 is tracing an outer one of the track turns.

The power save mode used in this embodiment is classified into three types below.

When it is required to record data on the optical disc 1 in the tow-hour mode, the controller 27 selects the first power save mode to turn off the tracking and traverse controls while keeping the focus control on. The sector storage 25 stores a sector address of one of sectors of the optical disc 1 on which data is to be recorded next. When the tracking control is in the off-state, a complete servo signal is not obtained. A component of an RF signal outputted intermittently from the pickup 4 is, thus, extracted and used in the CLV control of the spindle motor 2 to perform the rough servo control, providing the speed control signal to the spindle motor controller 30.

The power save is achieved by cutting the supply of power to, for example, a tracking error signal generator of the record/playback servo circuit 6, the tracking controller 9 of the second servo circuit 7, and the tracking circuit 12 of the driver 10.

After a lapse of a preselected period of time, as will be described later, the supply of power is resumed to activate the tracking control. The tracking control has the pickup 4 seek one of track turns of the optical disc 1 having a sector whose address is stored in the sector storage 25 and kicks the pickup 4 cyclically until that sector reaches the pickup 4.

When it is required to record data on the optical disc 1 in the four-hour mode, the controller 27 selects the second power save mode to turn off the focus and tracking controls and the laser 3. The laser 3 may alternatively be kept on. The sector storage 25 stores a sector address of one of sectors of the optical disc 1 on which data is to be recorded next. When the focus and tracking controls are in the off-state, a complete servo signal is not obtained. It is, thus, impossible to operate the spindle motor 2 under the CLV control, and the above described FG control is initiated. Specifically, the controller 27 determines the speed of the FG corresponding to the current one of sectors to keep the FG rotated at the determined speed.

The power saving is achieved by cutting the supply of power to all components of the record/playback servo circuit 6: the focus error signal generator, the tracking error signal generator, the reproduced signal generator, the equalizer, the PLL, the speed control signal generator, and the laser power controller, all components of the second servo circuit 7: the focus controller 8, the tracking controller 9, the traverse controller 40, and the spindle motor controller 30, part of the driver 10: the focus circuit 11, the tracking circuit 12, and the traversing circuit 41, and the laser 3. This allows the power consumption to be lowered greatly as compared with the first power save mode.

After a lapse of a preselected period of time, as will be described later, the supply of power is resumed to turn on the focus control, and the tracking control in that sequence. The tracking control has the pickup 4 seek one of track turns of the optical disc 1 having a sector whose address is stored in the sector storage 25 and kicks the pickup 4 cyclically until that sector reaches the pickup 4.

The reason that the spindle motor 2 is not turned off is because it takes approximately two seconds to resume rotating the spindle motor 2 at a desired speed, which exceeds a 500 msec memory holding time of the temporal memory 16. In order to reduce a more power consumption, it is advisable that the speed of the spindle motor 2 under the FG control be decreased to ½ or ¼ times a normal speed.

When it is required to record data on the optical disc 1 in the six-hour mode, the controller 27 selects the third power save mode to turn off the focus and tracking controls, the laser 3, and the spindle motor control. The sector storage 25 stores a sector address of one of sectors of the optical disc 1 on which data is to be recorded next.

Since the focus and tracking controls, the laser 3, and the spindle motor control are all turned off, the power consumption is reduce greatly. It, however, takes approximately one second to return the apparatus to the normal operation mode, and a great quantity of power is consumed in starting the spindle motor 2. Thus, if the third power save mode is not kept for more than six seconds, for example, it will cause the power consumption to be increased undesirably.

The power saving is achieved by cutting the supply of power to all components of the record/playback servo circuit 6: the focus error signal generator, the tracking error signal generator, the reproduced signal generator, the equalizer, the PLL, the speed control signal generator, and the laser power controller, all components of the second servo circuit 7: the focus controller 8, the tracking controller 9, the traverse controller 40, and the spindle motor controller 30, all components of the driver 10: the focus circuit 11, the tracking circuit 12, the traversing circuit 41, and the spindle motor circuit 31, and the laser 3. This results in a greater decrease in power consumption than in the first and second power save modes.

After a lapse of a preselected period of time, as will be described later, the supply of power is resumed to turn on the laser 3, the spindle motor control, the focus control, and the tracking control in that sequence. The tracking control has the pickup 4 seek one of track turns of the optical disc 1 having a sector whose address is stored in the sector storage 25 and kicks the pickup 4 cyclically until that sector reaches the pickup 4.

Figure 4A:
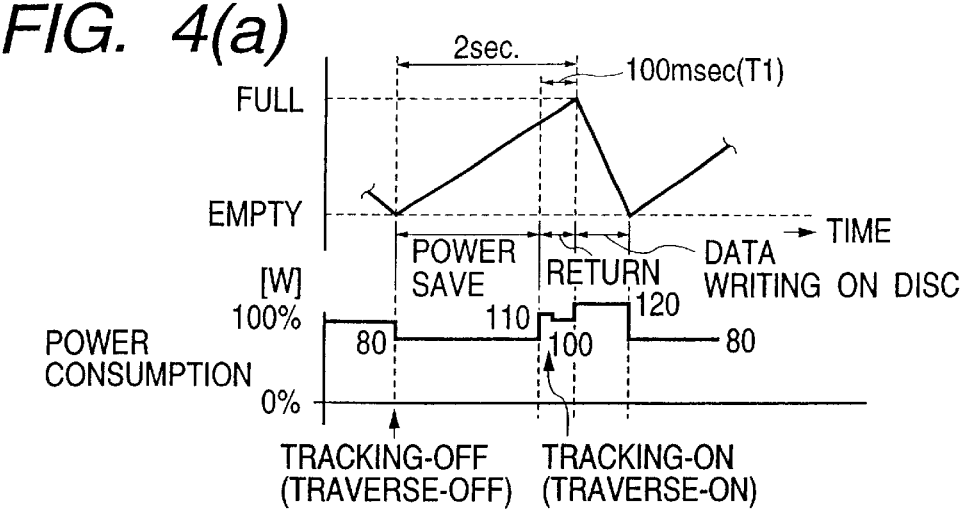
FIG. 4(a) shows a power save duration in the first power save mode.
Figure 4B:
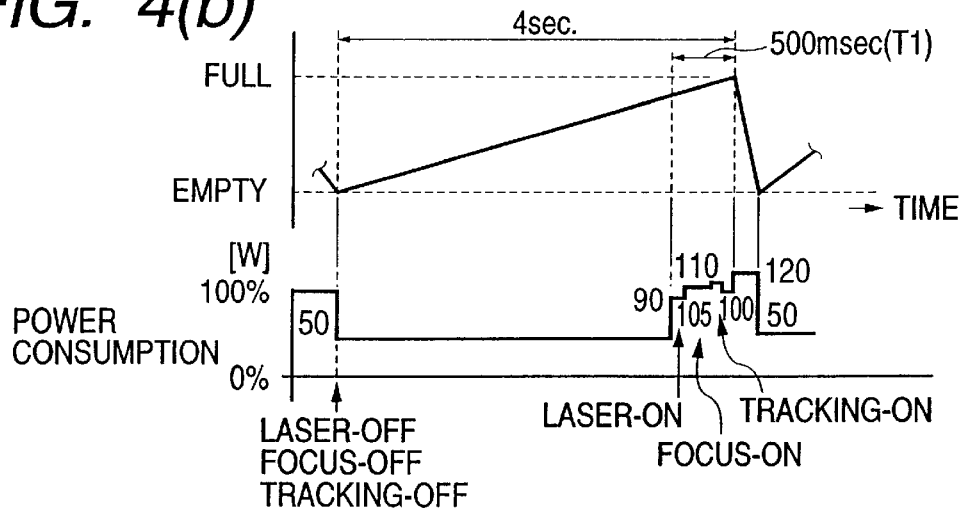
FIG. 4(b) shows a power save duration in the second power save mode.
Figure 4C:
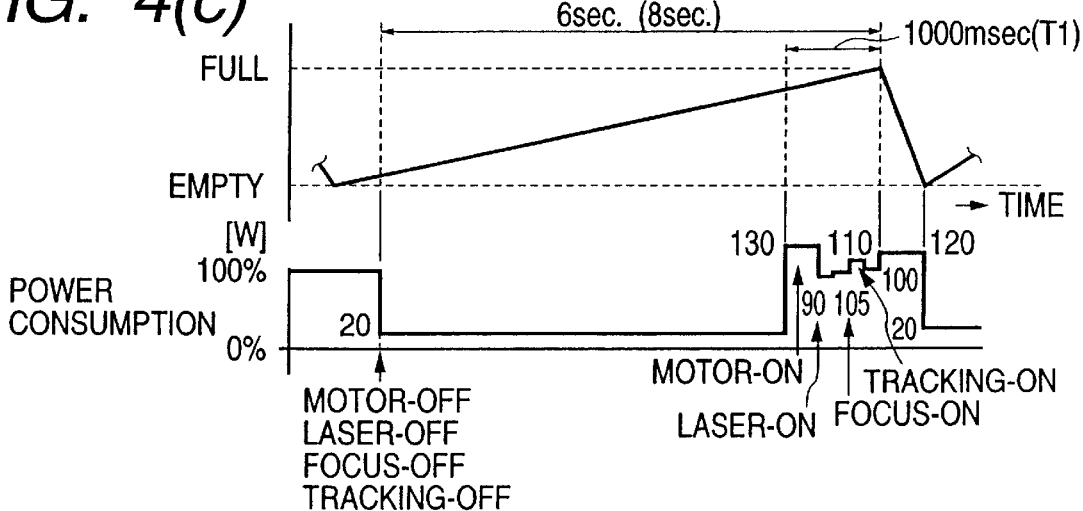
FIG. 4(c) shows a power save duration in the third power save mode.

FIGS. 4(A), 4(B), and 4(C) show changes in power consumption in the first, second, and third power save modes, respectively.

FIG. 4(A) illustrates for the case where image data is recorded in the two-hour mode in which a total recording time is approximately two hours, and the first power save mode is selected as a function of the compression rate of the image data. A high quality of images is, thus, ensured, but the transfer rate is high. The time required for the temporal memory 16 to reach the full level from the empty level (i.e., "c", "e", "g" in FIG. 3) is very short, about two seconds. The off-duration of the tracking and traversing controls is also short. The time T1 required for the apparatus to return to the normal operation mode from the first power save mode is, thus, short, about 100 msec. The power consumption of the apparatus during the first power save mode is about 80% of that in the normal standby mode of operation. During a period of time between turning on of the tracking control and a time when a given track turn has been sought after resumption of the normal power supply mode, a great power consumption of 110% is required instantaneously if the power consumption in the normal playback mode is defined as 100%. The amounts of power consumption in the standby mode and the record mode of operation are 100% and 120%, respectively.

FIG. 4(B) illustrates for the case where image data is recorded in the four-hour mode in which a total recording time is approximately four hours, and the second power save mode is selected as a function of the compression rate of the image data. The quality of images and the transfer rate are both common levels. The time required for the temporal memory 16 to reach the full level from the empty level is about four seconds which is slightly longer than that in the first power save mode. This will cause the time T1 required for the apparatus to return to the normal operation mode from the second power save mode to be increased to about 500 msec. The off-duration of the tracking and traversing controls and the laser 3 is, thus, set longer than that in the first power save mode, about 3.5 sec.

The power consumption of the apparatus during the second power save mode is about 50% of that in the standby mode of operation, which is lower than that in the first power save mode. When the normal power supply mode is resumed, the laser 3, the focus control, and the tracking control are turned on in sequence, so that the power consumption is increased gradually.

FIG. 4(C) illustrates for the case where image data is recorded in the six-hour mode in which a total recording time is approximately six hours, and the third power save mode is selected as a function of the compression rate of the image data. The quality of images is, thus, low, but the transfer rate is slow. The time required for the temporal memory 16 to reach the full level from the empty level is about six seconds which is longer than that in the second power save mode. This will cause the time T1 required for the apparatus to return to the normal operation mode from the third power save mode to be increased to about 1000 msec. The off-duration of the focus control, the tracking control, the laser 3, and the spindle motor control in the third power save mode is, thus, set longer than that in the second power save mode, about 5 sec. The power consumption of the apparatus during the third power save mode is about 20% of that in the standby mode of operation, which is lower than that in the second power save mode. When the normal power supply mode is resumed, the spindle motor control, the laser 3, the focus control, and the tracking control are turned on in sequence, so that the power consumption is increased gradually.

Figure 5:
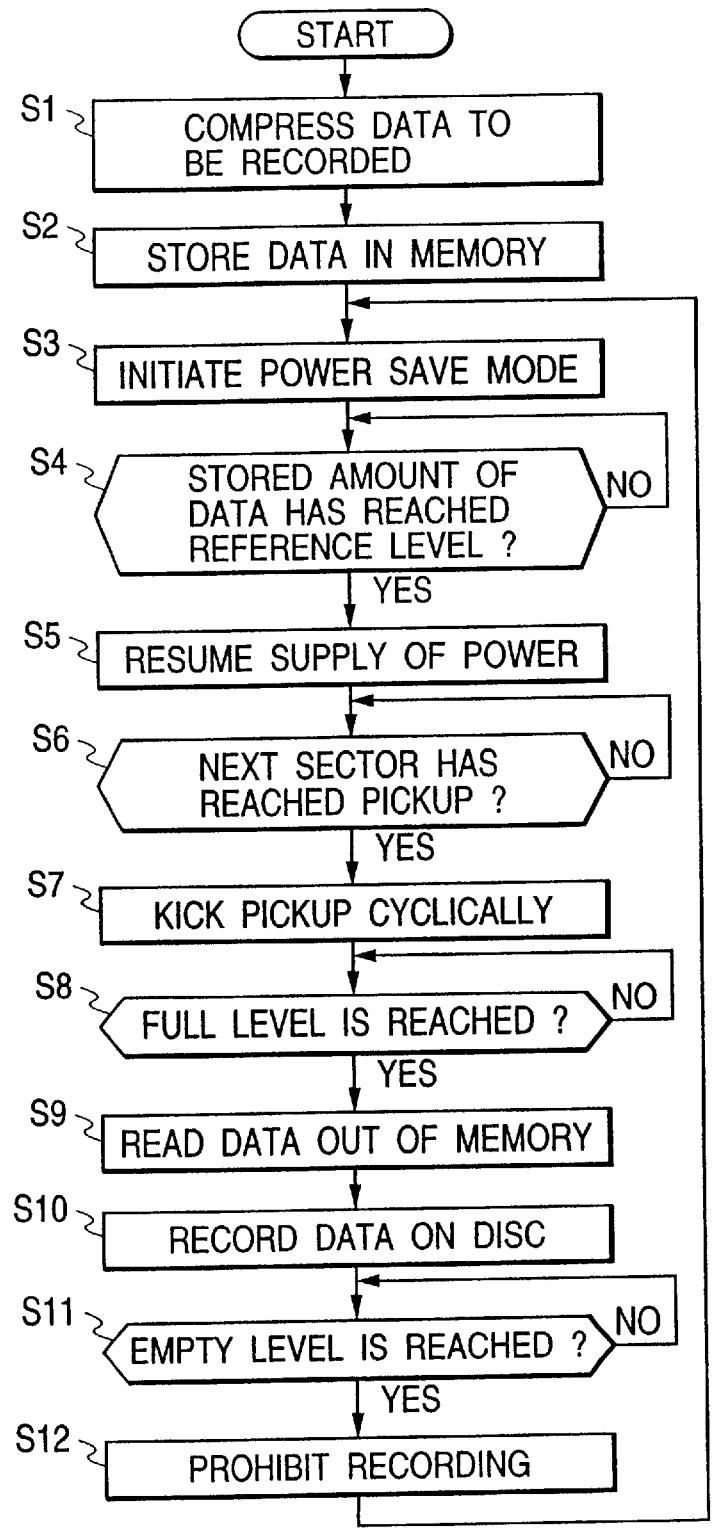
FIG. 5 is a flowchart of a power saving program in the first embodiment.

FIG. 5 shows a program or sequence of logical steps performed by the recording/reproducing apparatus of this embodiment.

Upon initiation of the record mode of operation, the routine proceeds to step 1 wherein the compressing circuit 37 compresses input data from the recording signal source 36. The routine proceeds to step 2 wherein the compressed data is stored in the temporal memory 16 (i.e., the data storage stage a in FIG. 3). The routine proceeds to step 3 wherein the controller 27 selects one of the first to third power save modes to cut the supply of power to the above described circuit components. The routine proceeds to step 4 wherein it is determined whether a stored amount of data in the temporal memory 16 monitored by the data storage control circuit 23 is increased up to the reference level or not. If a YES answer is obtained, then the routine proceeds to step 5 wherein the apparatus is switched in operation from the power save mode to the normal power supply mode to resume the supply of power to the circuit components undergoing the power cut, and the pickup 4 seeks one of track turns on the optical disc 1 which has one of sectors on which data is recorded next. The routine proceeds to step 6 wherein it is determined whether the one of sectors of the optical disc 1 has reached the pickup 4 or not. If a YES answer is obtained, then the routine proceeds to step 7 wherein the pickup 4 is kicked toward a previous track turn cyclically so as to trace the sought one of the track turns. The routine proceeds to step 8 wherein it is determined whether a stored amount of data in the temporal memory 16 monitored by the data storage control circuit 23 has reached the full level or not. If a YES answer is obtained, then the routine proceeds to step 9 wherein the signal processor 14 reads the compressed data out of the temporal memory 16 and adds an error correction code, an address code, a synchronous signal, etc. thereto. The routine proceeds to step 10 wherein the laser 3 is activated to record the data on the optical disc 1 (i.e., the data readout stage b in FIG. 3). The routine proceeds to step 11 wherein it is determined whether a stored amount of data in the temporal memory 16 has reached the empty level or not. If a YES answer is obtained, then the routine proceeds to step 12 wherein the controller 27 prohibits the signal processor 14 from reading the data out of the temporal memory 16 and the pickup 4 from recording the data on the optical disc 1. Subsequently, the routine returns back to step 3 and repeats steps 3 to 12 until all data is recorded on the optical disc 1.

If any signal or instruction to terminate the power saving operation immediately is inputted through the input device 26 or if a recording error occurs during the power saving operation, requiring data to be stored in the temporal memory 16 again, the controller 27 may detect that event to resume the supply of power immediately even during the power save mode.

In this embodiment, one of the first, second, and third power save modes is selected as a function of the compression rate of signals to be recorded on the optical disc 1, but may alternatively be selected as a function of type of the recording signals, which will be discussed below.

Figure 6:
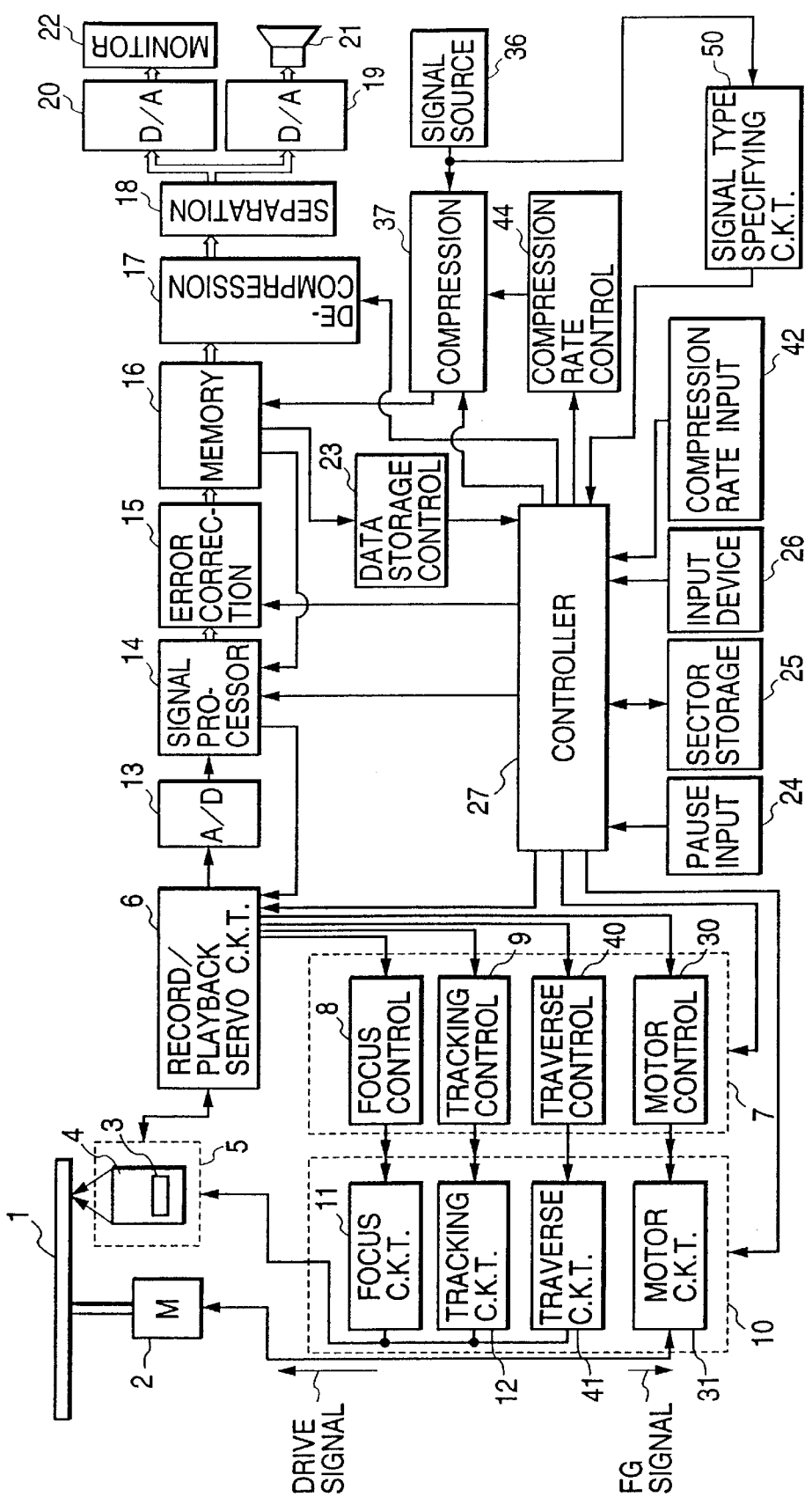
FIG. 6 is a block diagram which shows an optical recording/reproducing apparatus having a power save function according to the second embodiment of the invention.

FIG. 6 shows a recording/reproducing apparatus according to the second embodiment of the invention which is different from the first embodiment, as shown in FIG. 1, in that a signal type specifying circuit 50 is installed between the recording signal source 36 and the controller 27 for selecting one of the first to third power save modes based on the type of signal to be record on the optical disc 1. Other arrangements are identical, and explanation thereof in detail will be omitted here.

The signal type specifying circuit 50 specifies the type of signal outputted from the recording signal source 36 and provides a signal indicative thereof to the controller 27. The signal type specifying circuit 50 may alternatively be built in the input device 26 to design the input device 26 so that an operator may input the type of a recording signal manually into the controller 27.

Here, it is assumed that the signal type specifying circuit 50 discriminates between two types of signals: one consisting of both video and audio signals to be recorded on a DVD and the second consisting of only audio signal to be recorded on the DVD.

When an output from the recording signal source 36 consists of a combination of audio and video signals, the signal type specifying circuit 50 provides a signal indicative thereof to the controller 27. The controller 27 is responsive to the signal from the signal type specifying circuit 50 to determine that the video signal should be recorded with a high image quality in the two-hour mode, for example, sets the transfer rate of the signals to 8 Mpbs, and selects the first power save mode.

When an output from the recording signal source 36 consists of only an audio signal, the signal type specifying circuit 50 provides a signal indicative thereof to the controller 27. The controller 27 is responsive to the signal from the signal type specifying circuit 50 to determine that the audio signal should be recorded with a high tone quality in the eight-hour mode, for example, in which a total recording time is approximately eight hours, sets the transfer rate of the signals to 2 Mpbs, and selects the third power save mode. In this case, the time required for the amount of the audio signal stored in the temporal memory 16 to reach the full level from the empty level is, as shown in FIG. 4(c), about eight seconds.

The controller 27 may alternatively determine the data recording time or the transfer rate based on a manual.input through the compression rate input circuit 42.

The time T1 required for the apparatus to return to the normal operation mode is, like the first embodiment, different between the first and third power save modes. The controller 27 determines the time when the apparatus should return to the normal power supply mode as a function of a stored amount of data in the temporal memory 16 corresponding to the time T1 in each of the first and third power save modes in the manner as described above.

Figure 7:
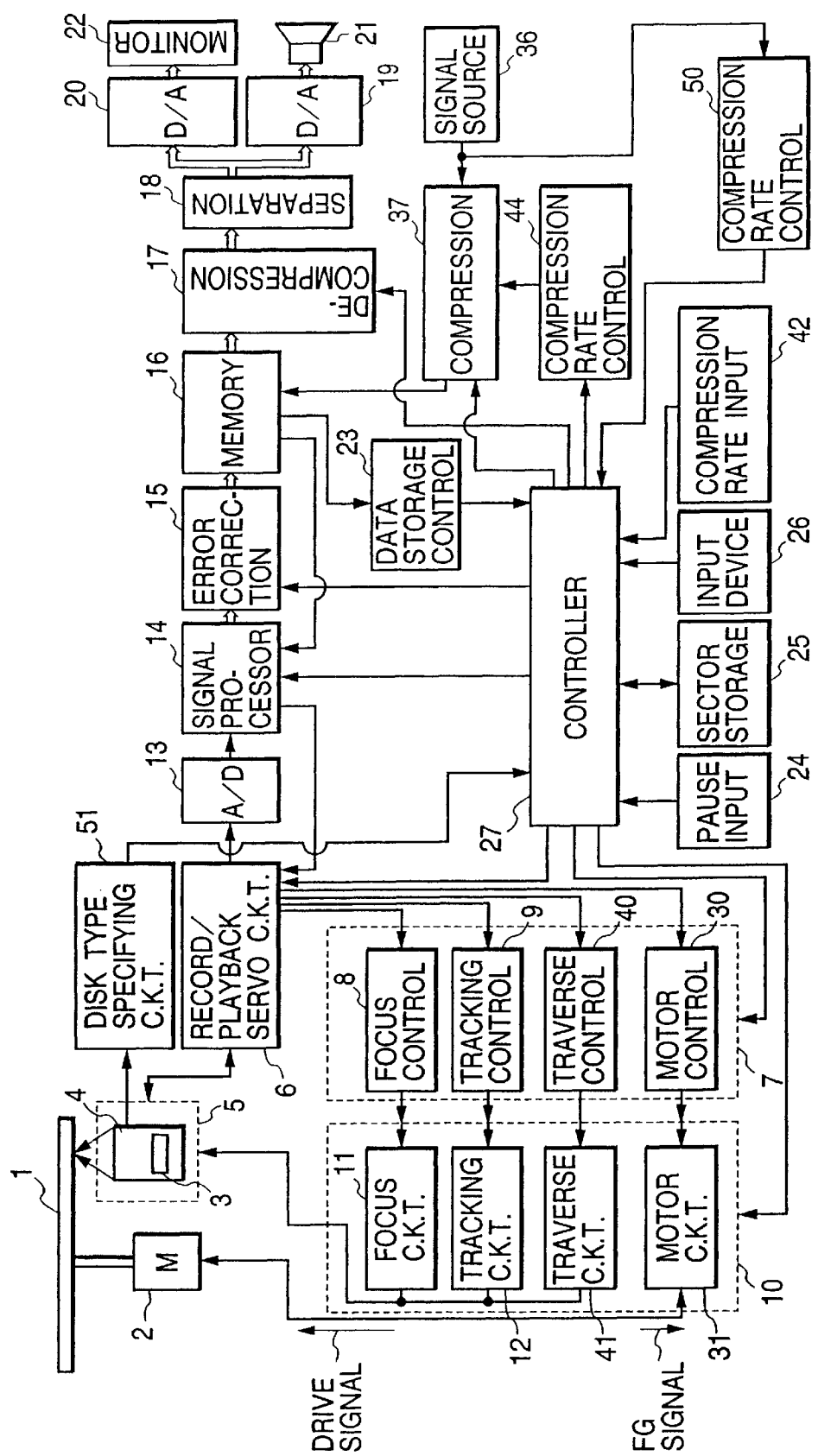
FIG. 7 is a block diagram which shows an optical recording/reproducing apparatus having a power save function according to the third embodiment of the invention.

FIG. 7 shows a recording/reproducing apparatus according to the third embodiment of the invention which is different from the second embodiment, as shown in FIG. 6, in that a disc type specifying circuit 51 is installed between the pickup 4 and the controller 27 for selecting one of the first to third power save modes according to the type of the optical disc 1 in addition to the type of signals to be recorded. Other arrangements are identical, and explanation thereof in detail will be omitted here.

The disc type specifying circuit 51 specifies the type of the optical disc 1 when loaded into the apparatus. There have been proposed in the art several manners to specify the type of a disc. For example, the type of the optical disc 1 may be specified by measuring the quantity of light reflected from the optical disc 1 based on the fact that the quantity of light reflected from an optical disc is different between the types of disc.

Here, it is assumed that the optical disc 1 is either of a DVD and a CD-RW, and a video signal outputted from the recording signal source 36 is either of a high-quality MPEG-2 signal and a normal quality MPEG-1 signal.

The disc type specifying circuit 51 determines whether the optical disc 1 is a DVD or a CD-RW disc. The signal type specifying circuit 50 determines whether an output from the recording signal source 36 is the high-quality MPEG-2 signal or the normal quality MPEG-1 signal. If the optical disc 1 is the DVD, and the MPEG-2 signal is outputted from the recording signal source 36, the controller 27 determines that the MPEG-2 signal should be recorded, for example, in the two-hour mode, sets the transfer rate of the signal to 8 Mbps, and selects the first power save mode. In this case, the temporal memory 16 with a capacity of 16 Mb becomes full, like the first embodiment, in two seconds, as shown in FIG. 4(A).

If the optical disc 1 is the CD-RW, and the MPEG-1 signal is outputted from the recording signal source 36, the controller 27 determines that the MPEG-1 signal should be recorded, for example, in a one-hour mode in which a total recording time is one hour, sets the transfer rate of the signal to 2 Mbps, and selects the third power save mode. In this case, the temporal memory 16 becomes full, like the second embodiment, in eight seconds, as shown in FIG. 4(C).

The time T1 required for the apparatus to return to the normal operation mode is, like the above embodiments, different between the first and third power save modes. In this embodiment, the time T1 in the first power save mode is, as shown in FIG. 4(A), 100 msec. The time T1 in the third power save mode is, as shown in FIG. 4(C), 1000 msec. The controller 27 determines the time when the apparatus should return to the normal power supply mode as a function of a stored amount of data in the temporal memory 16 corresponding to the time T1 in each of the first and third power save modes in the manner as described above.

Figure 8:
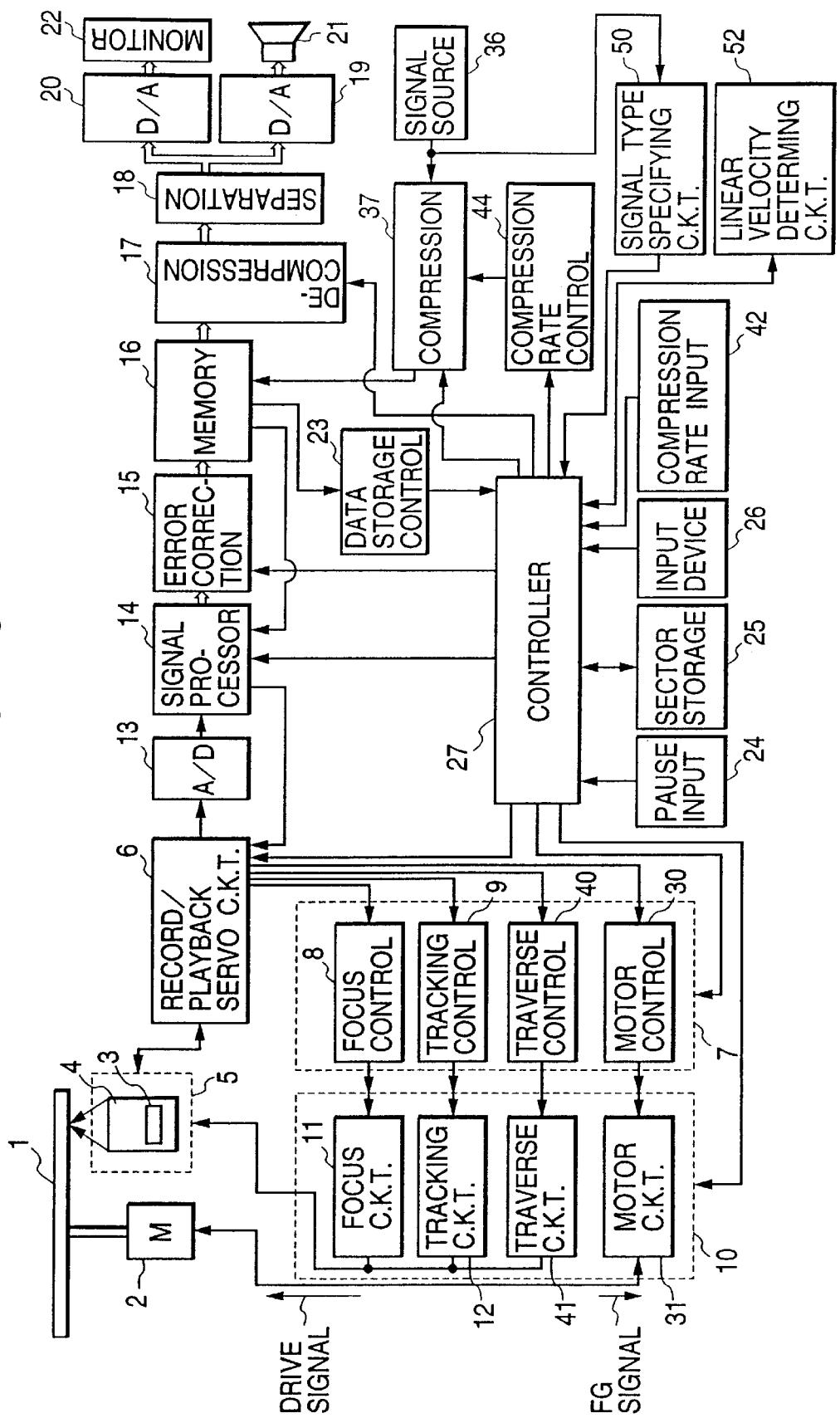
FIG. 8 is a block diagram which shows an optical recording/reproducing apparatus having a power save function according to the fourth embodiment of the invention.

FIG. 8 shows a recording/reproducing apparatus according to the fourth embodiment of the invention which is different from the second embodiment, as shown in FIG. 6, in that a linear velocity determining circuit 52 is installed between the signal type specifying circuit 50 and the controller 27 for selecting one of the first to third power save modes as a function of the linear velocity of the optical disc 1 and the type of signal to be recorded. Other arrangements are identical, and explanation thereof in detail will be omitted here.

The linear velocity determining circuit 52 determines a target linear velocity of the optical disc 1, that is, the speed of the spindle motor 2 to be controlled based on the transfer rate of signals outputted from the recording signals source 36 and provides a signal indicative thereof to the controller 27. The transfer rate of signals to be recorded on the optical disc 1 is, as described above, determined by the controller 27 automatically according to the type of signal to be recorded specified by the signal type determining circuit 50 or a manual input through the compression rate input circuit 42.

As an example, two cases where audio signals are recorded on a DVD at a higher transfer rate and at a lower transfer rate will be referred to below.

For instance, when it is required to record linear PCM six-channel signals at a transfer rate of 8 Mbps in the two-hour mode, the controller 27 selects the first power save mode.

When it is required to record MPEG-2 two-channel signals at a transfer rate of 2 Mbps in the eight-hour mode, the controller 27 selects the second power save mode.

As apparent from the above discussion, the controller 27 selects one of the first and second power save modes based on outputs from the signal type specifying circuit 50 and the linear velocity determining circuit 52. Specifically, when the transfer rate of signals to be recorded is low, the linear velocity determining circuit 52 decreases a target linear velocity of the optical disc 1, and the controller 27 decreases the speed of the spindle motor 2. For example, when MPEG-1 signals are recorded on the optical disc 1, the linear velocity of the optical disc 1 is lowered to half that when linear PCM signals are recorded.

The reason that when data is recorded at a transfer rate of 2 Mb in the second embodiment, the third power save mode is selected, while when the MPEG-2 two-channel signals are recorded at the same transfer rate of 2 Mb, the second power save mode is selected is because if a total time period required for a stored amount of data in the temporal memory 16 to be increased from the empty level to the full level and then decreased to the empty level (i.e., c+T1+d in FIG. 3) is constant, a decrease in speed of the optical disc 1 by half will cause the time required to record data on the optical disc 1 (i.e., the duration of the data readout stage b, d, . . . f in FIG. 3) to be doubled, thus resulting in a decrease in time (i.e., the duration of the data storage stage c, e, g, . . . ) during which the power can be saved, therefore, if the third power save mode is selected in which the spindle motor 2 is turned off, it will cause the power consumption to be increased undesirably unless the third power save mode is kept for more than six seconds, for example, because it takes approximately one second to return the apparatus to the normal operation mode, and a great quantity of power is consumed in starting the spindle motor 2.

When the speed of the optical disc 1 is reduced, it will cause the time required for the optical disc 1 to reach a target speed to be increased. It is, thus, advisable that the controller 27 change the set time when the apparatus should be returned to the normal power supply mode as a function of a change in speed of the optical disc 1.

Figure 9:
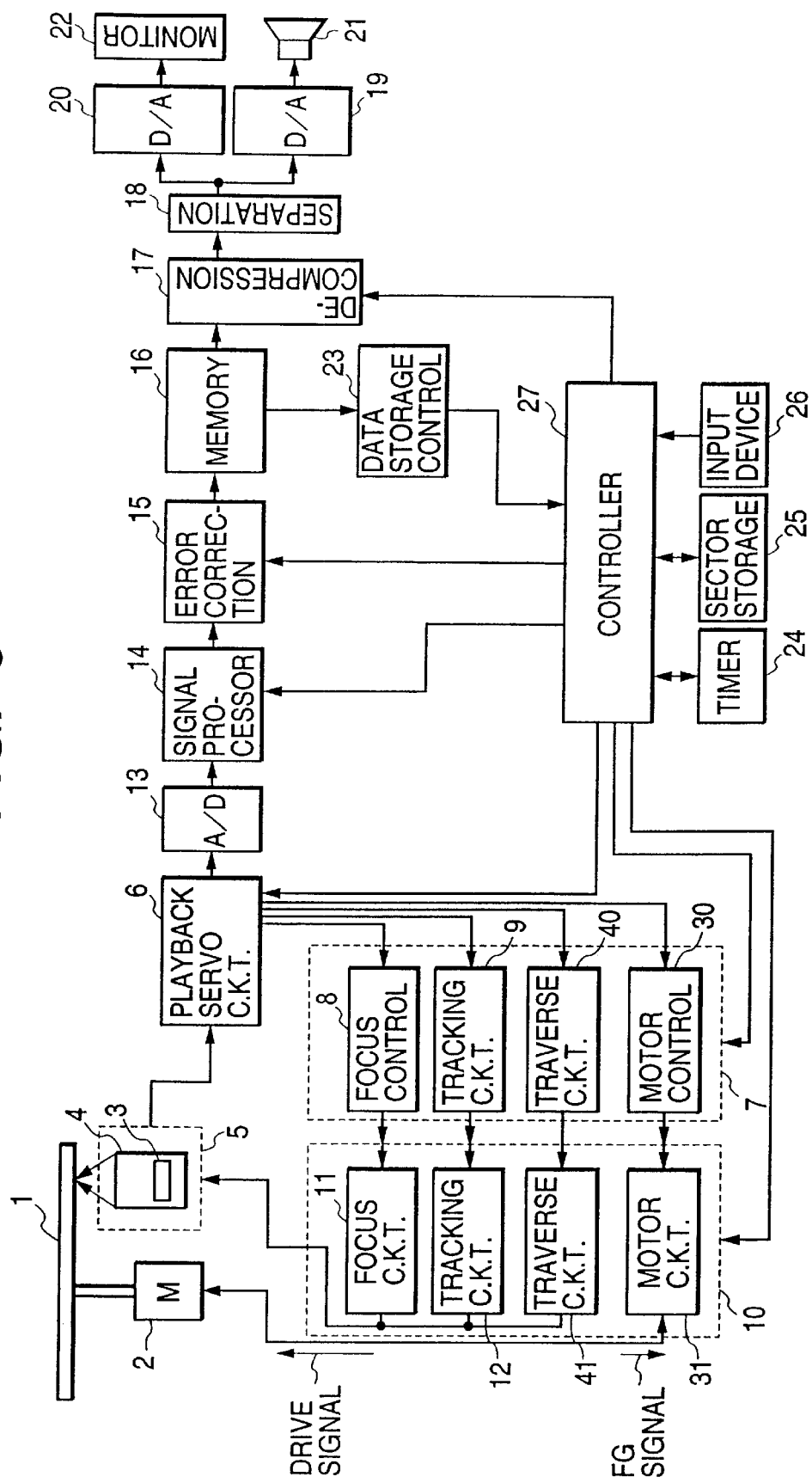
FIG. 9 is a block diagram which shows an optical reproducing apparatus having a power save function according to the fifth embodiment of the invention.

FIG. 9 shows a reproducing apparatus according to the fifth embodiment of the invention which is designed to save the power consumed in the playback mode of operation. The same reference numbers as employed in the first embodiment shown in FIG. 1 refer to the same parts, but they perform only the function of playback.

The reproducing apparatus includes a timer 240 which measures the elapsed time from prohibition of storage of data in the temporal memory 16 and provides a signal to the controller 27 when the elapsed time has reached a preselected period of time (e.g., 400 msec.).

The temporal memory 16 in this embodiment has a capacity of 4 Mb. If the optical disc 1 is a DVD, and data is reproduced therefrom at a transfer rate of 8 Mbps, then the temporal memory 16 is allowed to store the amount of data corresponding to 500 msec.

For instance, if it takes 80 msec. for the optical disc 1 to make a complete turn of a track, the temporal memory 16 can hold the amount of data corresponding to about six turns of the track.

Figure 10:
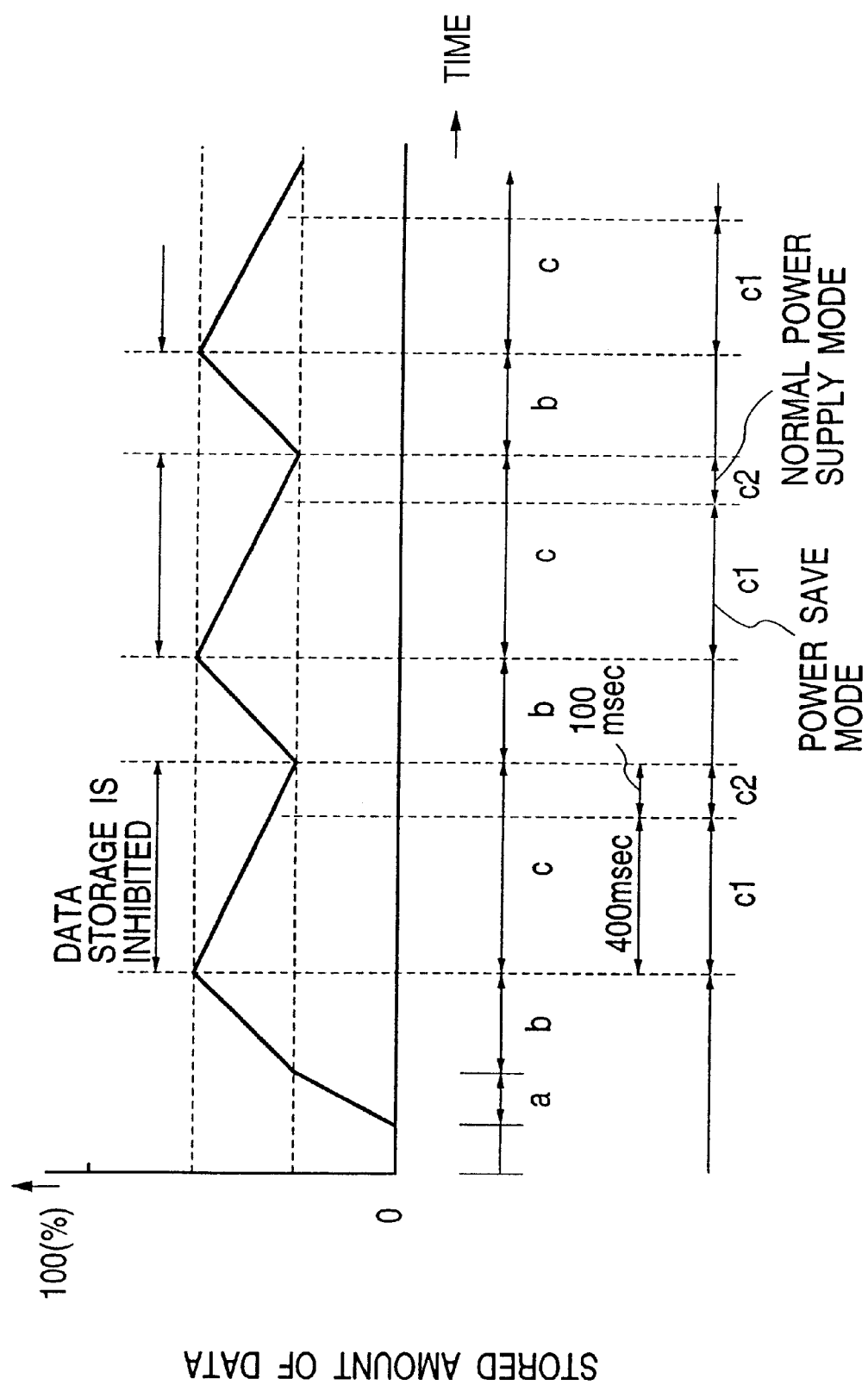
FIG. 10 is a time chart which shows a variation in amount of data stored in a temporal memory in the fifth embodiment.

FIG. 10 shows a variation in amount of data stored in the temporal memory 16 in the playback mode of operation. The full level and the empty level in the drawing do not indicate stored amounts of 100% and 0%, respectively, but values to which preselected margins are added. The stored amount of data in the temporal memory 16 is monitored by the data storage control circuit 23.

After passing through the playback servo circuit 6, the A/D converter 13, the signal processor 14, and the error correction circuit 15, signals reproduced through the pickup 4 from a selected one of sectors of the optical disc 1 are stored in the temporal memory 16 (a data storage stage a in FIG. 10). When a stored amount of data in the temporal memory 16 reaches the empty level, the data is read out of the temporal memory 16 and supplied to the decompressing circuit 17 (a data storage/readout stage b). The speed at which data is reproduced from the optical disc 1 is faster than that at which data is read out of the temporal memory 16.

When the stored amount of data in the temporal memory 16 reaches the full level, the controller 27 inhibits data from being stored in the temporal memory 16 (storage inhibit stages c1 and c2). The pickup 4 starts to be kicked and is kept kicked at regular intervals until the stored amount of data in the temporal memory 16 reaches the empty level (in practice, until a given period of time expires). The sector storage 25 stores an address of one of the sectors of the optical disc 1 from which data is to be reproduced next.

During a given period of time after the stored amount of data in the temporal memory 16 reaches the full level, the controller 27 of this embodiment cuts the supply of power to some circuit components which need not be operated in that period of time. For instance, the controller 27 cuts the supply of power to the circuit components until 400 msec. which is slightly shorter than the time (e.g., 500 msec.) required for the stored amount of data in the temporal memory 16 to reach the empty level from the full level expires after the stored amount of data in the temporal memory 16 reaches the full level. A time interval of 400 msec. is, as described above, measured by the timer 240.

The power save mode in the storage inhibit stage c1 is classified into three types below, During the storage inhibit stage c1, the data stored in the temporal memory 16 continues to be read out therefrom. The supply of power, thus, must be cut without blocking the servo control and the readout of data from the temporal memory 16. Therefore, in the first power save mode, the controller 27 cuts the supply of power to the signal processor 14 and the error correction circuit 15 to inhibit synchronous detection, decoding, and error correction and inhibits control of writing of data in the temporal memory 16.

In operation of the servo system, the pickup 4 is kept kicked in the first power save mode for 400 msec. after the stored amount of data in the temporal memory 16 reaches the full level. After a lapse of 400 msec., the pickup 4 continues to be kicked in the normal operation mode of the apparatus.

In the second power save mode, the controller 27 turns off the tracking control while keeping the focus control on in addition to the operation in the power save mode. The sector storage 25 stores a sector address of one of sectors of the optical disc 1 on which data is to be reproduced next. When the tracking control is in the off-state, a complete servo signal is not obtained. A component of an RF signal outputted intermittently from the pickup 4 is, thus, extracted and used in the CLV control mode of the spindle motor 2 to perform the rough servo control, producing the speed control signal.

The power saving is achieved through the controller 27 by cutting the supply of power to, for example, the tracking error signal generator of the playback servo circuit 6, the tracking controller 9 of the second servo circuit 7, and the tracking circuit 12 of the driver 10.

After a lapse of 400 msec. the controller 27 resumes the supply of power to turn on the tracking control to kick the pickup 4 at regular intervals until one of the sectors of the optical disc 1 whose address is stored in the sector storage 25 is reached.

In the third power save mode, the controller 27 turns off the focus control and the tracking control in addition to the operation in the first power save mode. The sector storage 25 stores a sector address of one of sectors of the optical disc 1 on which data is to be reproduced next. When the focus control and the tracking control are in the off-state, a complete servo signal is not obtained. It is, thus, impossible to operate the spindle motor 2 under the CLV control, and the above described FG control is initiated. Specifically, the controller 27 determines the speed of the FG corresponding to the current one of sectors to keep the FG rotated at the determined speed.

The power saving is achieved through the controller 27 by cutting the supply of power to all components of the playback servo circuit 6, all components of the second servo circuit 7, and part of the driver 10, for example, the focus circuit 11 and the tracking circuit 12. This allows the power consumption to be reduced greatly as compared with the second power save mode.

The duration of the storage inhibit stage c1 which is measured by the timer 240 is set to 300 msec. which is shorter than that in the first and second power save modes, allowing the time required for the focus and tracking controls to return to the steady state. Thus, 300 msec. after the stored amount of data in the temporal memory 16 reaches the full level, the third power save mode is switched to the normal power supply mode to resume the supply of power to the focus control and the tracking control in sequence to kick the pickup 4 at regular intervals until one of the sectors of the optical disc 1 whose address is stored in the sector storage 25 is reached.

In each of the first to third power save modes, upon input of any signal through the input device 26, the power supply may be resumed immediately. For instance, in a case where the reproducing apparatus of this embodiment is a portable video player, the power supply may be resumed upon manual input of a signal for searching a desired portion or the leader of a moving picture or occurrence of an error in reproducing audio or image signals, requiring reproduction of desired data from the optical disc 1 again. The input of the signal and the occurrence of the error may be monitored automatically in the controller 27.

Figure 11:
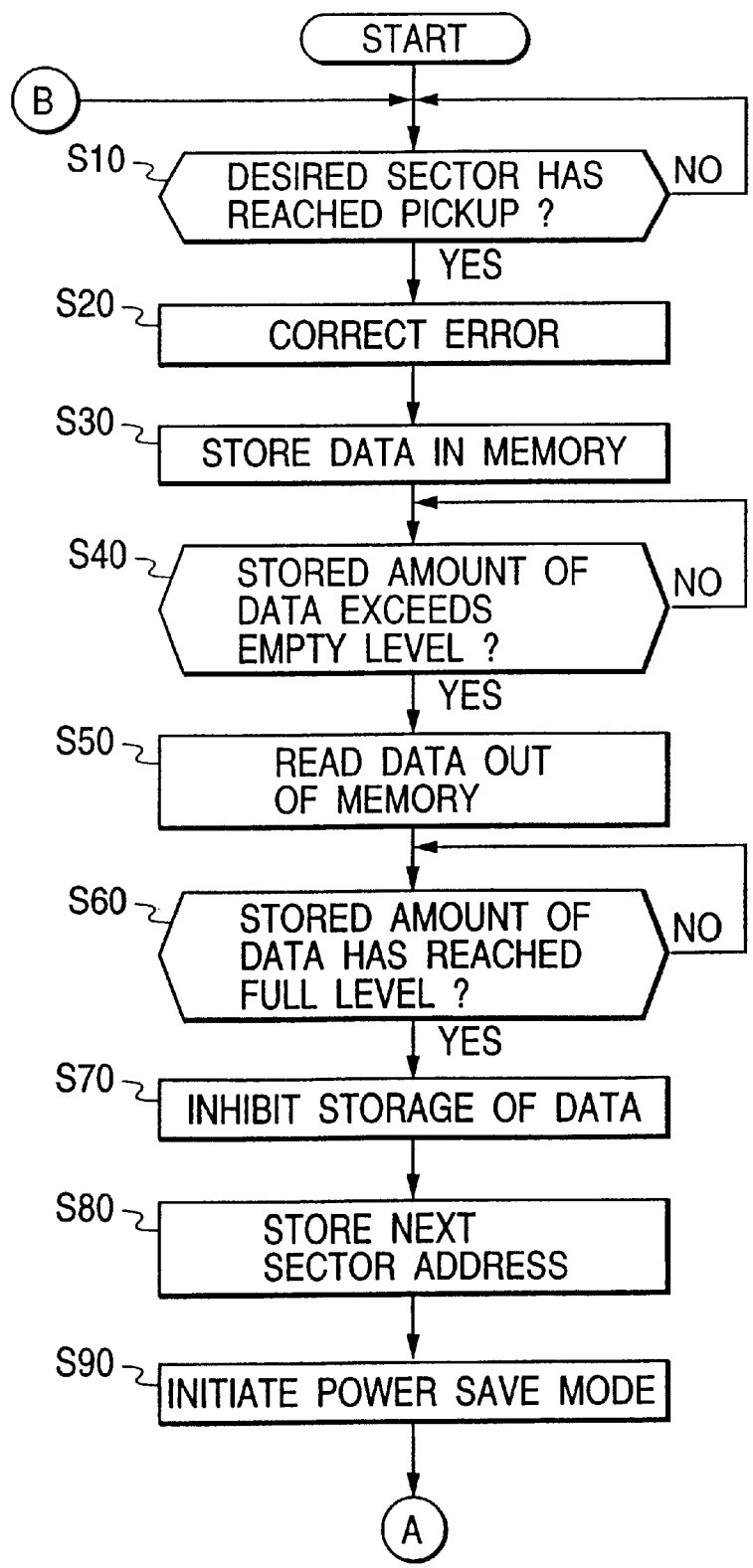
FIGS. 11 and 12 show a flowchart of a power saving program in the fifth embodiment.
Figure 12:
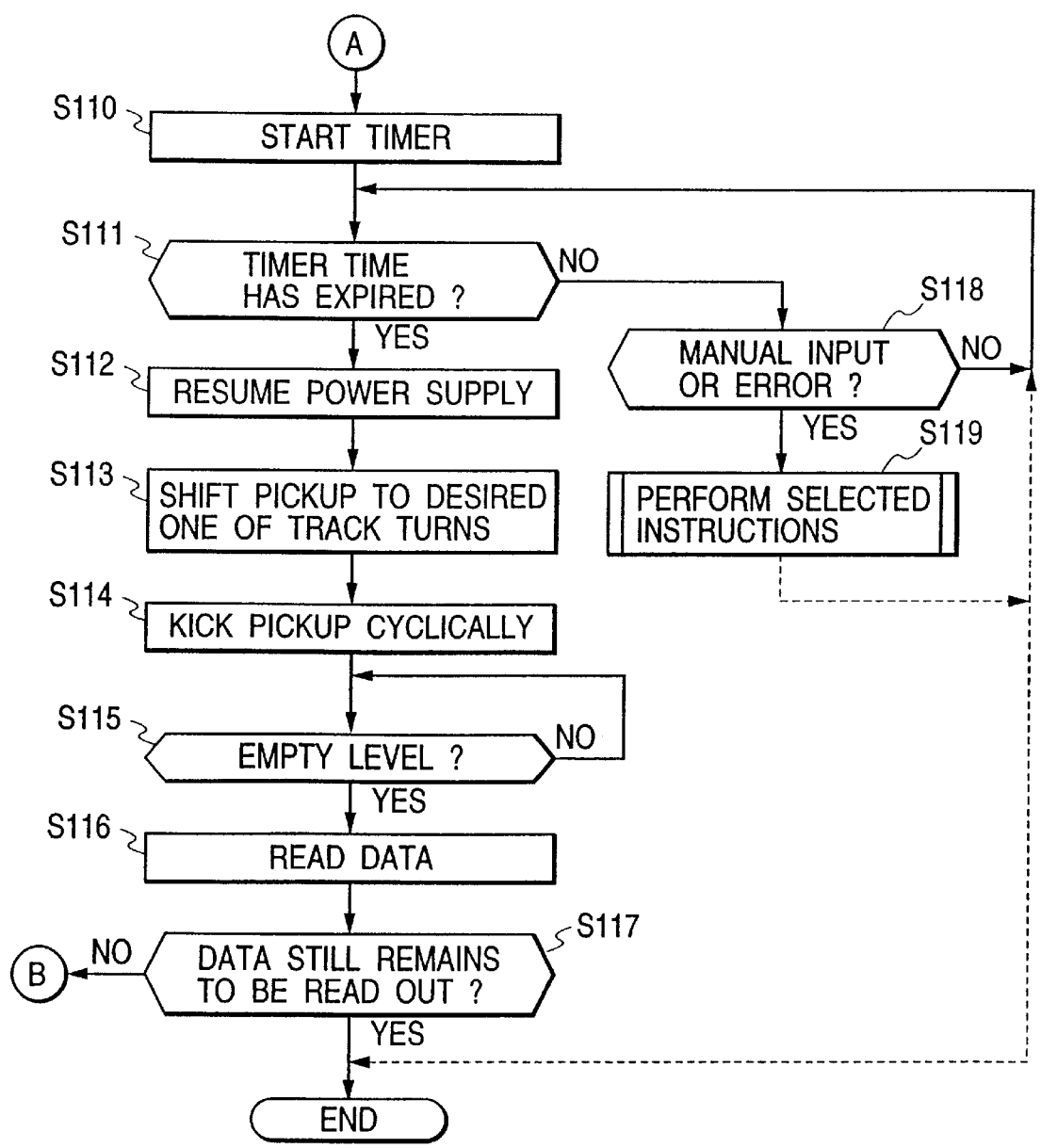

FIGS. 11 and 12 show a program or sequence of logical steps performed by the recording/reproducing apparatus of the fifth embodiment.

Upon initiation of the playback mode of operation, the routine proceeds to step 10 wherein it is determined whether one of sectors from which reproduction of data is to be started has reached the pickup 4 or not. If a YES answer is obtained, then the reproduction of data is started, and the routine proceeds to step 20 wherein the reproduced data is subjected to error correction through the error correction circuit 15. The routine proceeds to step 30 wherein the error-corrected data is stored in the temporal memory 16. The routine proceeds to step 40 wherein it is determined whether a stored amount of data in the temporal memory 16 monitored by the data storage control circuit 23 exceeds the empty level or not. If a YES answer is obtained, then the routine proceeds to step 50 wherein the controller 27 activates the decompressing circuit 17 to start to read the data out of the temporal memory 16 and to decompress it. The routine proceeds to step 60 wherein it is determined whether a stored amount of data in the temporal memory 16 has reached the full level or not. If a YES answer is obtained, then the routine proceeds to step 70 wherein the controller 27 inhibits data from being stored in the temporal memory 16. The routine proceeds to step 80 wherein the sector storage 25 stores a sector address of one of sectors of the optical disc 1 from which data is to be reproduced next. The routine proceeds to step 90 wherein a preselected one of the first to third power save mode is entered.

The routine proceeds to step 110 in FIG. 5 wherein the timer 240 is activated. The routine proceeds to step 111 wherein the timer 240 determines whether a preselected period of time, e.g., 400 msec. has passed or not. If a YES answer is obtained, then the routine proceeds to step 112 wherein the power save mode is terminated to resume the normal power supply mode. The routine proceeds to step 113 wherein the controller 27 reads out the sector address stored in the sector storage 25 in step 80 and has the pickup 4 seek one of the track turns of the optical disc 1 which has the sector specified by the sector address read out of the sector storage 25. The routine proceeds to step 114 wherein the pickup 4 is kicked at regular intervals to trace the one of the track turns. The routine proceeds to step 115 wherein it is determined whether a stored amount of data in the temporal memory 16 has reached the empty level or not. If a YES answer is obtained, then the routine proceeds to step 116 wherein the pickup 4 start to read data out of one of the sectors specified by the sector address read out of the sector storage 25. The routine proceeds to step 117 wherein it is determined whether the one of the sectors holds available data or not, that is, whether data still remains to be read out of the optical disc 1 or not.

If a NO answer is obtained meaning that reproduction of all data has been completed, the routine terminates. Alternatively, if a YES answer is obtained, then the routine returns back to step 10 in FIG. 11.

If a NO answer is obtained in step 111, then the routine proceeds to step 118 wherein it is determined whether the above described manual input has been provided through the input device 26 or not and whether the error in reproducing audio or image signals has occurred or not. If a NO answer is obtained, then the routine returns back to step 111. Alternatively, if a YES answer is obtained, then the routine proceeds to step 119 wherein the controller 27 terminates the power save mode before 400 msec. expires, and performs instructions programmed therein to cure the error or given by the manual input. The routine returns back to step 111 or terminates according to the instructions performed in step 119.

Figure 13:
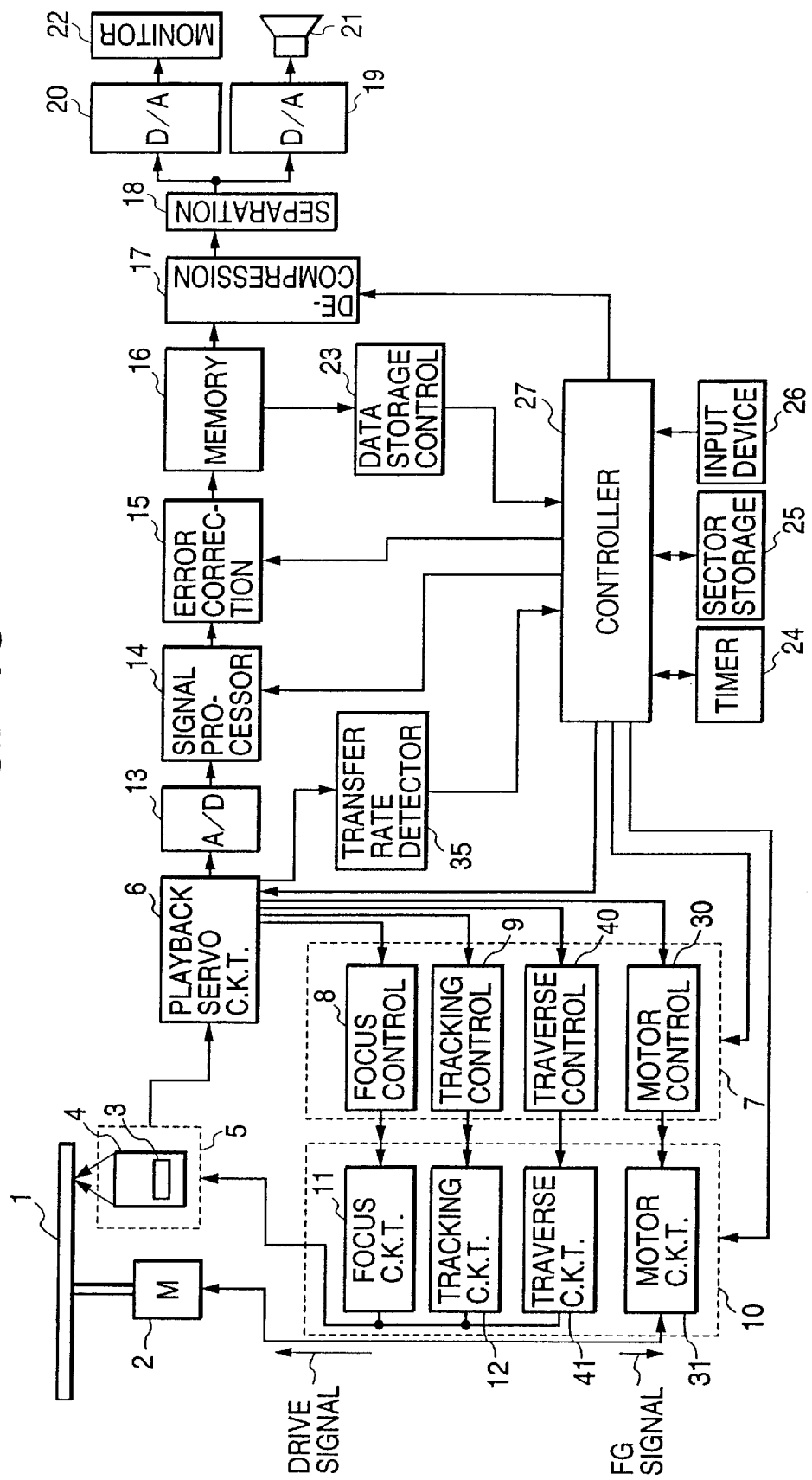
FIG. 13 is a block diagram which shows an optical reproducing apparatus having a power save function according to the sixth embodiment of the invention.

FIG. 13 shows a reproducing apparatus according to the sixth embodiment of the invention which is different from the fifth embodiment in that a transfer rate detector 35 is provided to detect the transfer rate of reproduced signals for saving the power consumed in the playback mode of operation as a function thereo.

The transfer rate detector 35 reads a control signal out of signals reproduced from the optical disc 1 to find the data recording mode (e.g., the two-hour mode, the four-hour mode, or the six-hour mode, as described above) of the reproduced signals for determining the transfer rate thereof and outputs a signal indicative thereof to the controller 27. The controller 27 selects one of the fourth, fifth, and sixth power save modes, as will be described below, as a function of the transfer rate of the reproduced signals.

In the fourth power save mode, the controller 27 turns off only the tracking control while keeping the focus control on. The sector storage 25 stores a sector address of one of sectors of the optical disc 1 on which data is to be reproduced next. When the tracking control is in the off-state, a complete servo signal is not obtained. A component of an RF signal outputted intermittently from the pickup 4 is, thus, extracted and used in the CLV control mode of the spindle motor 2 to perform the rough servo control, providing the speed control signal to the spindle motor controller 30.

The power saving is achieved through the controller 27 by cutting the supply of power to, for example, the tracking error signal generator of the playback servo circuit 6, the tracking controller 9 of the second servo circuit 7, and the tracking circuit 12 of the driver 10.

After a lapse of 400 msec., as will be discussed later, the controller 27 resumes the supply of power to turn on the tracking control to kick the pickup 4 at regular intervals until one of sectors whose address is stored in the sector storage 25 is reached.

In the fifth power save mode, the controller 27 turns off the focus control, the tracking control, and the laser 3. The sector storage 25 stores a sector address of one of the sectors of the optical disc 1 on which data is to be reproduced next. When the focus control and the tracking control are in the off-state, a complete servo signal is not obtained. It is, thus, impossible to operate the spindle motor 2 under the CLV control, and the above described FG control is initiated. Specifically, the controller 27 determines the speed of the FG corresponding to the current one of sectors to keep the FG rotated at the determined speed.

The power saving is achieved through the controller 27 by cutting the supply of power to all components of the playback servo circuit 6, all components of the second servo circuit 7, and part of the driver 10: the focus circuit 11 and the tracking circuit 12. This allows the power consumption to be reduced greatly as compared with the second power save mode.

After a lapse of 500 msec., as will be discussed later, the controller 27 resumes the supply of power to turn on the laser 3, the focus control, and the tracking control in that sequence to kick the pickup 4 at regular intervals and waits for one of the sectors whose address is stored in the sector storage 25 to reach the pickup 4. The reason that the spindle motor 2 is not turned off is because it takes approximately two seconds to resume rotating the spindle motor 2 at a desired speed, which exceeds a 500 msec memory holding time of the temporal memory 16. In order to reduce power consumption, it is advisable that the speed of the spindle motor 2 under the FG control be decreased to ½ or ¼ times a normal speed.

In the sixth power save mode, the controller 27 turns off the focus and tracking controls, the laser 3, and the spindle motor control. The sector storage 25 stores a sector address of one of sectors of the optical disc 1 on which data is to be recorded next.

Since the focus and tracking controls, the laser 3, and the spindle motor control are all turned off, the power consumption is reduce greatly. It, however, takes approximately one second to return the apparatus to the normal mode of operation, and a great quantity of power is consumed in starting the spindle motor 2. Thus, if the sixth power save mode is not kept for more than six seconds, for example, it will cause the power consumption to be increased undesirably.

The power saving is achieved through the controller 27 by cutting the supply of power to all components of the playback servo circuit 6, all components of the second servo circuit 7, all components of the driver 10, and the laser 3. This results in a greater decrease in power consumption than in the fourth and fifth power save modes.

After a lapse of 1000 msec., as will be described later, the controller 27 resumes the supply of power to turn on the laser 3, the spindle motor control, the focus control, and the tracking control in that sequence to kick the pickup 4 at regular intervals and waits for one of sectors whose address is stored in the sector storage 25 to reach the pickup 4.

Figure 14A:
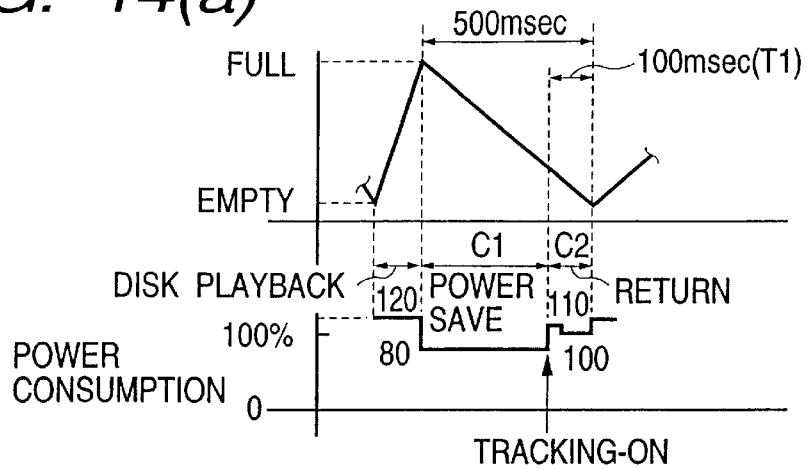
FIG. 14(a) shows a power save duration in the fourth power save mode.
Figure 14B:
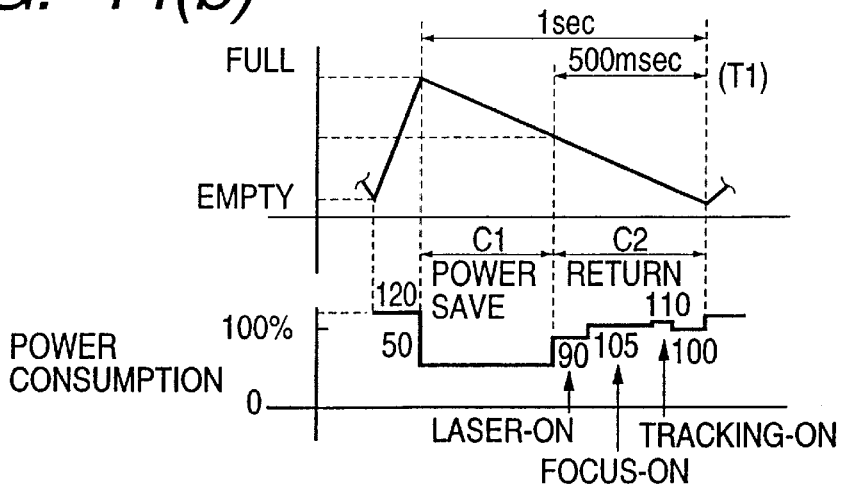
FIG. 14(b) shows a power save duration in the fifth power save mode.
Figure 14C:
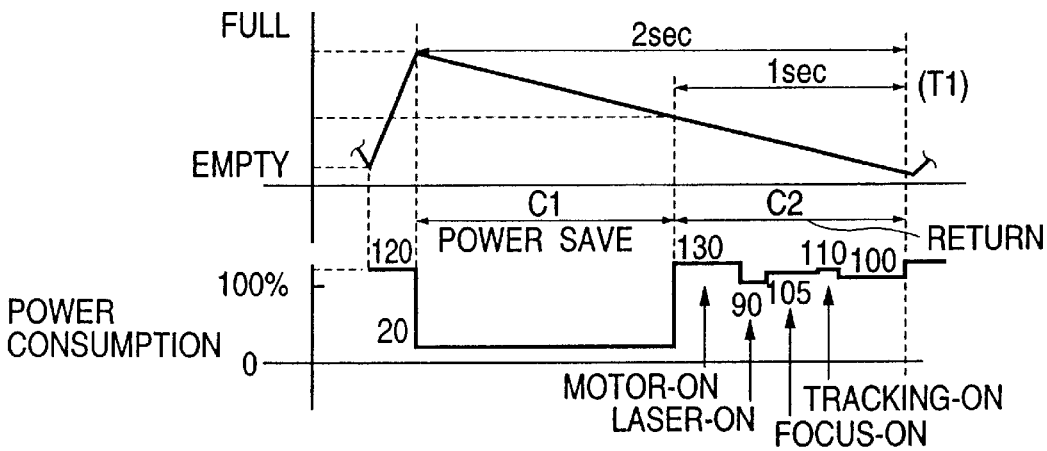
FIG. 14(c) shows a power save duration in the sixth power save mode.

FIGS. 14(A), 14(B), and 14(C) show changes in power consumption in the fourth, fifth, and sixth power save modes, respectively.

FIG. 14(A) illustrates for the case where image data is reproduced from the optical disc 1 in the two-hour mode in which a total playback time is approximately two hours, and the fourth power save mode is selected. A high quality of images is, thus, ensured, but the transfer rate is high. The time required for the temporal memory 16 to reach the empty level from the full level (i.e., the storage inhibit stages c1 and c2 in FIG. 10) is very short, about 500 msec. The time T1 required for the apparatus to return to the normal operation mode from the fourth power save mode T1 (i.e., the duration of the storage inhibit stage C2)is short, about 100 msec. The off-duration of the tracking control in the fourth power save mode (i.e., the storage inhibit stage C1) is, thus, set short, about 400 msec. The power consumption of the apparatus during the fourth power save mode is about 80% of that in the normal standby mode of operation. During a period of time between turning on of the tracking control and a time when a given track turn has been sought upon resumption of the normal operation mode, a great power consumption of 110% is required instantaneously if the power consumption in the normal playback mode is defined as 100%. The amounts of power consumption in the standby mode and the playback mode of operation are 100% and 120%, respectively.

FIG. 14(B) illustrates for the case where image data is recorded in the four-hour mode in which a total playback time is approximately four hours, and the fifth power save mode is selected. The quality of images and the transfer rate are both common levels. The time required for the temporal memory 16 to reach the empty level from the full level is about 1 sec. which is slightly longer than that in the fourth power save mode. This will cause the time T1 required for the apparatus to return to the normal operation mode from the fifth power save mode (i.e., the duration of the storage inhibit stage C2) to be increased to about 500 msec. The off duration of the focus and tracking controls and the laser 3 in the fifth power save mode (i.e., the duration of the storage inhibit stage C1) is, thus, set longer than that in the first power save mode, about 500 sec. The power consumption of the apparatus during the firth power save mode is about 50% of that in the standby mode of operation, which is lower than that in the fourth power save mode. Upon resumption of the normal power supply mode, the laser 3, the focus control, and the tracking control are turned on in sequence, so that the power consumption is increased gradually.

FIG. 14(C) illustrates for the case where image data is recorded in the six-hour mode in which a total playback time is approximately six hours, and the sixth power save mode is selected. Thus, the quality of images is low, but the transfer rate is slow. The time required for the temporal memory 16 to reach the empty level from the full level is about 2 sec. which is longer than that in the fifth power save mode. This will cause the time T1 required for the apparatus to return to the normal operation mode from the sixth power save mode to be increased to about 1 sec. The off-duration of the focus control, the tracking control, the laser 3, and the spindle motor control (i.e., the duration of the storage inhibit stage C1), thus, become longer than that in the fifth power save mode, about 1 sec. The power consumption of the apparatus during the sixth power save mode is about 20% of that in the normal standby mode of operation, which is lower than that in the fifth power save mode. Upon resumption of the normal power supply mode, the spindle motor control, the laser 3, the focus control, and the tracking control are turned on in sequence, so that the power consumption is increased gradually.

Total amounts of power consumption in FIGS. 14(A) to 14(C) are approximately 84%, 75%, and 60% of that in the normal power supply mode, respectively. The use of the fourth to sixth power save modes allows the power economy to be assured without sacrificing the playback operation.

The timing with which the controller 27 terminates the power saving operation is determined in the following manner.

The temporal memory 16 has, as described above, a capacity of 4 Mb. Thus, for instance, when image data is reproduced at 8 Mbps in the two-hour mode, it allows the temporal memory 16 to hold the image data for 0.5 sec. When the controller 27 is responsive to an output from the transfer rate detector 35 indicating that the image data is being reproduced at 8 Mbps to select the fourth power save mode, the amount of image data read out of the temporal memory 16 during the storage inhibit stage c2, that is, a period of time required for the apparatus to return to the normal operation mode following the termination of the fourth power save mode may be calculated in the following manner. If the empty level is defined as zero (0) Mb, and the full level is defined as 4 Mb, then a ratio of the time T1 to the time required for the temporal memory 16 to reach the empty level from the full level is 100 msec./500 msec.=0.2. The amount of image data read out of the temporal memory 16 during the storage inhibit stage c2, that is, the time T1 is, thus, 4 Mb×0.2=0.8 Mb. Therefore, the controller 27 may terminates the power saving operation when the amount of image data remaining in the temporal memory 16 becomes at least 0.8 Mb.

Figure 15:
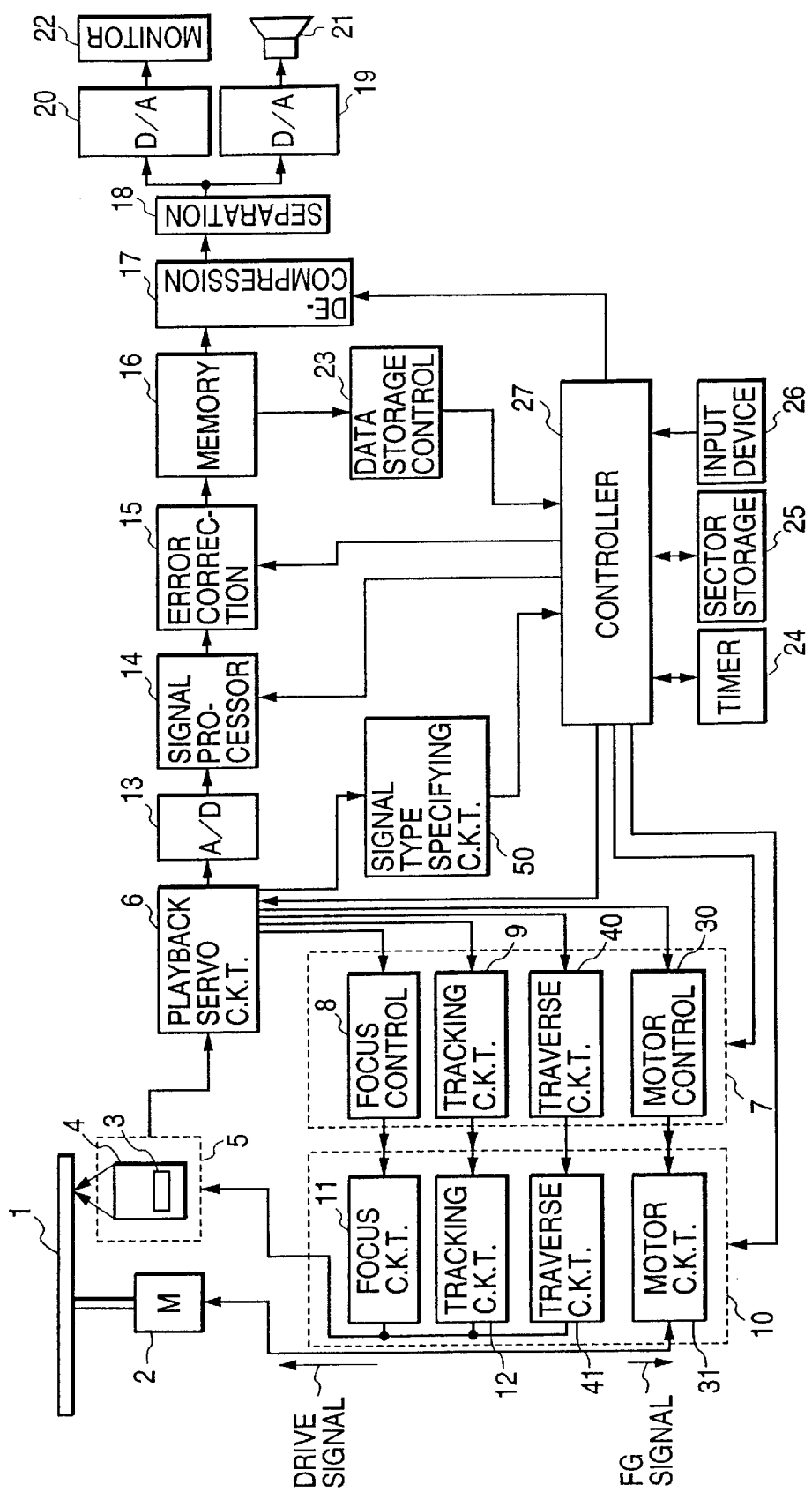
FIG. 15 is a block diagram which shows an optical reproducing apparatus having a power save function according to the seventh embodiment of the invention.

FIG. 15 shows a reproducing apparatus according to the seventh embodiment of the invention which is different from the fifth embodiment, as shown in FIG. 9, in that a signal type specifying circuit 50 is installed between the playback servo circuit 6 and the controller 27 for selecting one of the fourth to sixth power save modes based on the type of signal reproduced from the optical disc 1. Other arrangements are identical, and explanation thereof in detail will be omitted here.

The signal type specifying circuit 50 specifies the type of signal inputted to the playback servo circuit 6 and provides a signal indicative thereof to the controller 27. The signal type specifying circuit 50 may alternatively be built in the input device 26 so that an operator can input the type of a reproduced signal manually into the controller 27.

Here, it is assumed that the signal type specifying circuit 50 discriminates between two types of signals: one consisting of both video and audio signals reproduced from a DVD and the second consisting of only an audio signal reproduced from the DVD.

In a case where a combination of audio and video signals is reproduced from the optical disc 1, the signal type specifying circuit 36 monitors an input to the playback servo circuit 6 to determine that data is being reproduced at 8 Mbps in the two-hour mode, for example, and provides a signal indicative thereof to the controller 27. The controller 27 is responsive to the input from the signal type specifying circuit 26 to select the fourth power save mode.

In a case where only an audio signal is reproduced from the optical disc 1, the signal type specifying circuit 36 monitors an input to the playback servo circuit 6 to determine that data is being reproduced at 2 Mbps in the eighth-hour mode, for example, and provides a signal indicative thereof to the controller 27. The controller 27 is responsive to the input from the signal type specifying circuit 26 to select the sixth power save mode.

Figure 16:
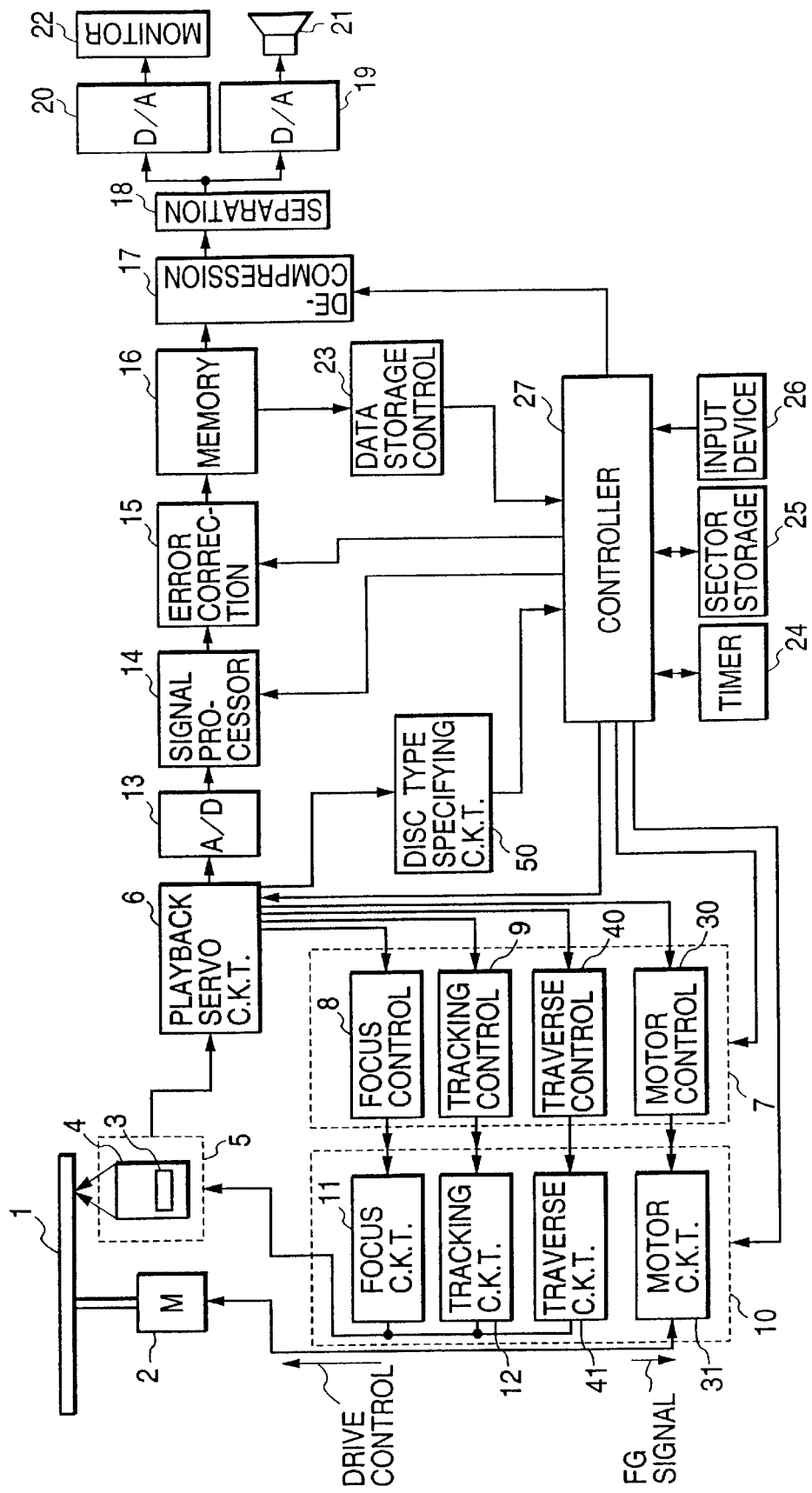
FIG. 16 is a block diagram which shows an optical reproducing apparatus having a power save function according to the eighth embodiment of the invention.

FIG. 16 shows a reproducing apparatus according to the eighth embodiment of the invention which is different from the seventh embodiment, as shown in FIG. 15, in that a disc type specifying circuit 51 is installed between the playback servo circuit 6 and the controller 27 for selecting one of the fourth to sixth power save modes according to the type of the optical disc 1. Other arrangements are identical, and explanation thereof in detail will be omitted here.

The disc type specifying circuit 51 has substantially the same structure as the one used in the third embodiment of FIG. 7 which specifies the type of the optical disc 1 when loaded into the apparatus.

Here, it is assumed that the optical disc 1 is either of a DVD and a CD-RW, and a video signal reproduced from the optical disc 1 is either of a high-quality MPEG-2 signal and a normal quality MPEG-1 signal.

The disc type specifying circuit 51 determines whether the optical disc 1 is a DVD or a CD-RW disc. If the optical disc 1 is the DVD from which the high-quality MPEG-2 signal is being reproduced at 8 Mbps in the two-hour mode, for example, the disc type specifying circuit 51 provides a signal indicative thereof to the controller 27. The controller 27 is responsive to the signal from the disc type specifying circuit 51 to select the fourth power save mode. Alternatively, if the optical disc 1 is the CD-RW disc from which the normal quality MPEG-1 signal is being reproduced at 2 Mbps in the one-hour mode, for example, the disc type specifying circuit 51 provides a signal indicative thereof to the controller 27. The controller 27 is responsive to the signal from the disc type specifying circuit 51 to select the sixth power save mode.

Figure 17:
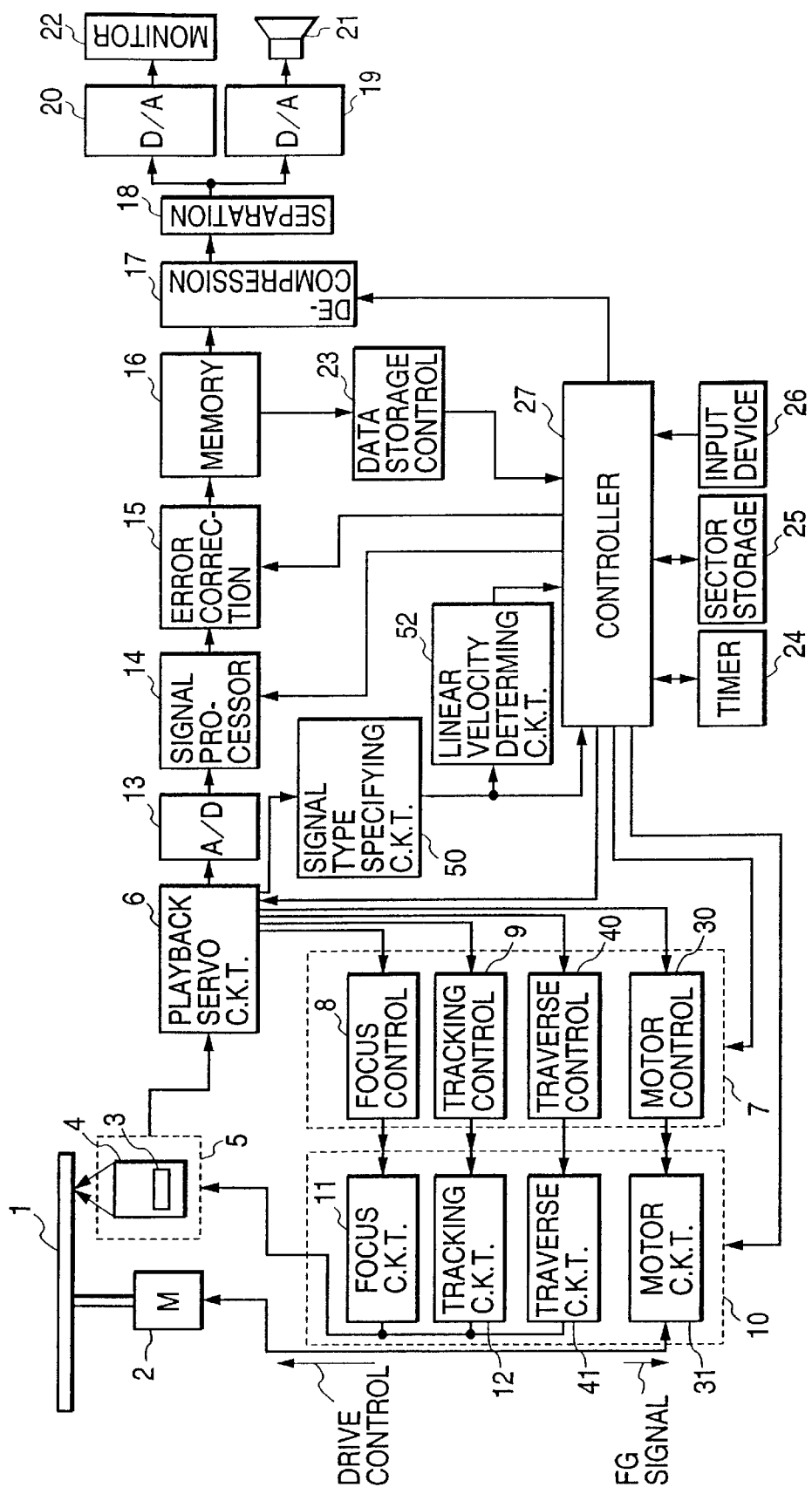
FIG. 17 is a block diagram which shows an optical reproducing apparatus having a power save function according to the ninth embodiment of the invention.

FIG. 17 shows a reproducing apparatus according to the ninth embodiment of the invention which is different from the seventh embodiment, as shown in FIG. 15, in that a linear velocity determining circuit 52 is further installed between the signal type specifying circuit 50 and the controller 27 for selecting one of the fourth to sixth power save modes as a function of the linear velocity of the optical disc 1 and the type of signal reproduced from the optical disc 1. Other arrangements are identical, and explanation thereof in detail will be omitted here.

The linear velocity determining circuit 52 determines a target linear velocity of the optical disc 1, that is, the speed of the spindle motor 2 to be controlled based on the transfer rate of signals reproduced from the optical disc 1 and provides a signal indicative thereof to the controller 27.

As an example, two cases where audio signals are reproduced from a DVD at a higher transfer rate and at a lower transfer rate will be referred to below.

For instance, when linear PCM six-channel signals are being reproduced at a transfer rate of 8 Mbps in the two-hour mode, the linear velocity determining circuit 52 determines a target linear velocity of the optical disc 1 based on the transfer rate of the reproduced signals and provides a signal indicative thereof to the controller 27. The controller 27 is responsive to outputs from the signal type specifying circuit 50 and the linear velocity determining circuit 52 to select the fourth power save mode.

When MPEG-2 two-channel signals are being reproduced at a transfer rate of 2 Mbps in the eight-hour mode, for example, the controller 27 selects the fifth power save mode.

As apparent from the above discussion, the controller 27 selects one of the fourth and fifth power save modes based on outputs from the signal type specifying circuit 50 and the linear velocity determining circuit 52. When the transfer rate of signals being reproduced is low, the controller 27 decreases the speed of the spindle motor 2, or the linear velocity of the optical disc 1 to agree with a target linear velocity determined by the linear velocity determining circuit 52. For example, when MPEG-1 signals are being reproduced from the optical disc 1, the velocity of the optical disc 1 is lowered to half that when linear PCM signals are being reproduced.

The reason that when data is reproduced at a transfer rate of 2 Mb in the seventh embodiment, the sixth power save mode is selected, while when the MPEG-2 two-channel signals are recorded at the same transfer rate of 2 Mb, the fifth power save mode is selected is the same as described in the fourth embodiment shown in FIG. 8.

Figure 18:
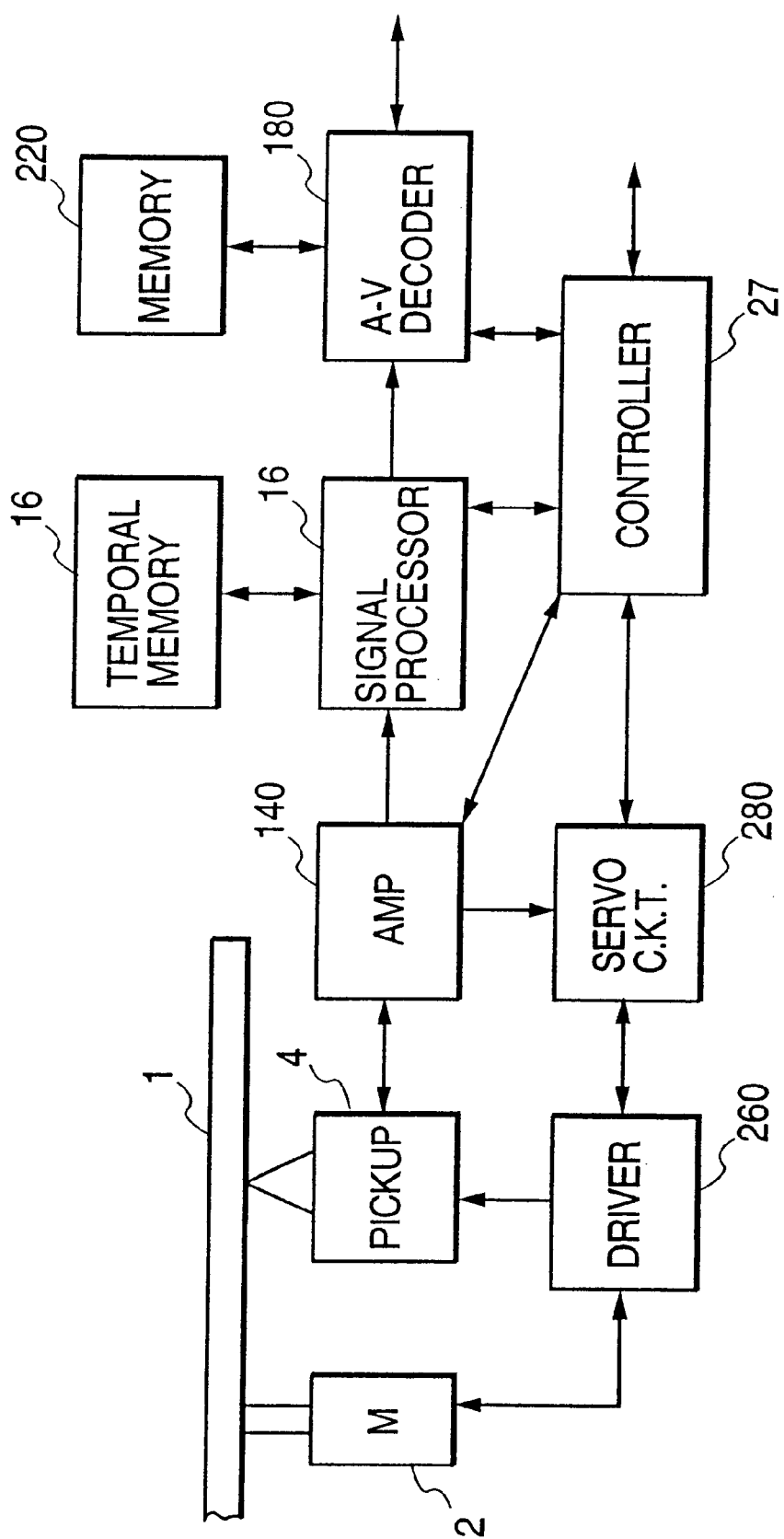
FIG. 18 is a block diagram which shows a DVD player having a power save function according to the tenth embodiment of the invention.

FIG. 18 shows a DVD player according to the tenth embodiment of the invention.

The DVD player includes generally the spindle motor 2, the pickup 4, the amplifier 140, the signal processor 14, the servo circuit 280, the driver 260, the temporal memory 16, a 16 Mb memory 220, the A-V decoder 180, and the controller 27. The temporal memory 16 consist of a DRAM with a capacity of 4 Mb. The A-V decoder 180 is connected to components such as the separator 18, the D/A converters 19 and 20, the monitor 22, and the speaker 21, as shown in FIG. 1. The controller 27 is also connected to a post-circuit (not shown).

In operation, the pickup 4 reads data out of the optical disc 1 and outputs it to the amplifier 140 to provide an audio/video signal and a control signal. The audio/video signal is optimized in frequency characteristic by an equalizer built in the amplifier 140 and supplied to the signal processor 14 after passing through a PLL in the amplifier 140. The signal processor 14 converts the audio/video signal in a digital form into an analog signal. For example, the signal processor 14 subjects an EFM(Eight to Fourteen Modulation)+ signal read out of the optical disc 1 to synchronous detection and decodes it into NRZ data. The NRZ data is subjected to error correction and split into a data signal and a sector address signal. The data signal is a signal compressed in a variable transfer rate and stored in the temporal memory 16 to absorb a variation in transfer rate. The data signal read out of the temporal memory 16 by the signal processor 14 is supplied to the A-V decoder 180 and decompressed using the memory 220 to produce an audio and a video signal which are, in turn, converted by D/A converters into an analog audio signal and an analog video signal, respectively.

The control signal produced by the amplifier 140 is supplied to the servo circuit 280 to produce servo signals for focus and tracking control of the pickup 4. The servo signals are inputted to the driver 260. The driver 260 operates an actuator to drive the pickup 4 under the servo control. The amplifier 140 also produces a speed control signal through the PLL and sends it to the driver 260. The driver 260 is responsive to the speed control signal to spin the optical disc 1 under the CLV control through the spindle motor 2. The spindle motor 2 produces an angular position signal through a Hall element (not shown) which is fed back to the servo circuit 280 to produce a speed control signal which is used as needed in the FG (Frequency Generator) control to maintain the speed of the spindle motor 2 constant.

The temporal memory 16 in this embodiment has a capacity of 4 Mb. In a case of a DVD, the temporal memory 16 is allowed to store the amount of data corresponding to about 500 msec. For instance, if it takes 80 msec. for the optical disc 1 to make a complete turn of a track, the temporal memory 16 can hold the amount of data corresponding to about six turns of the track.

Figure 19:
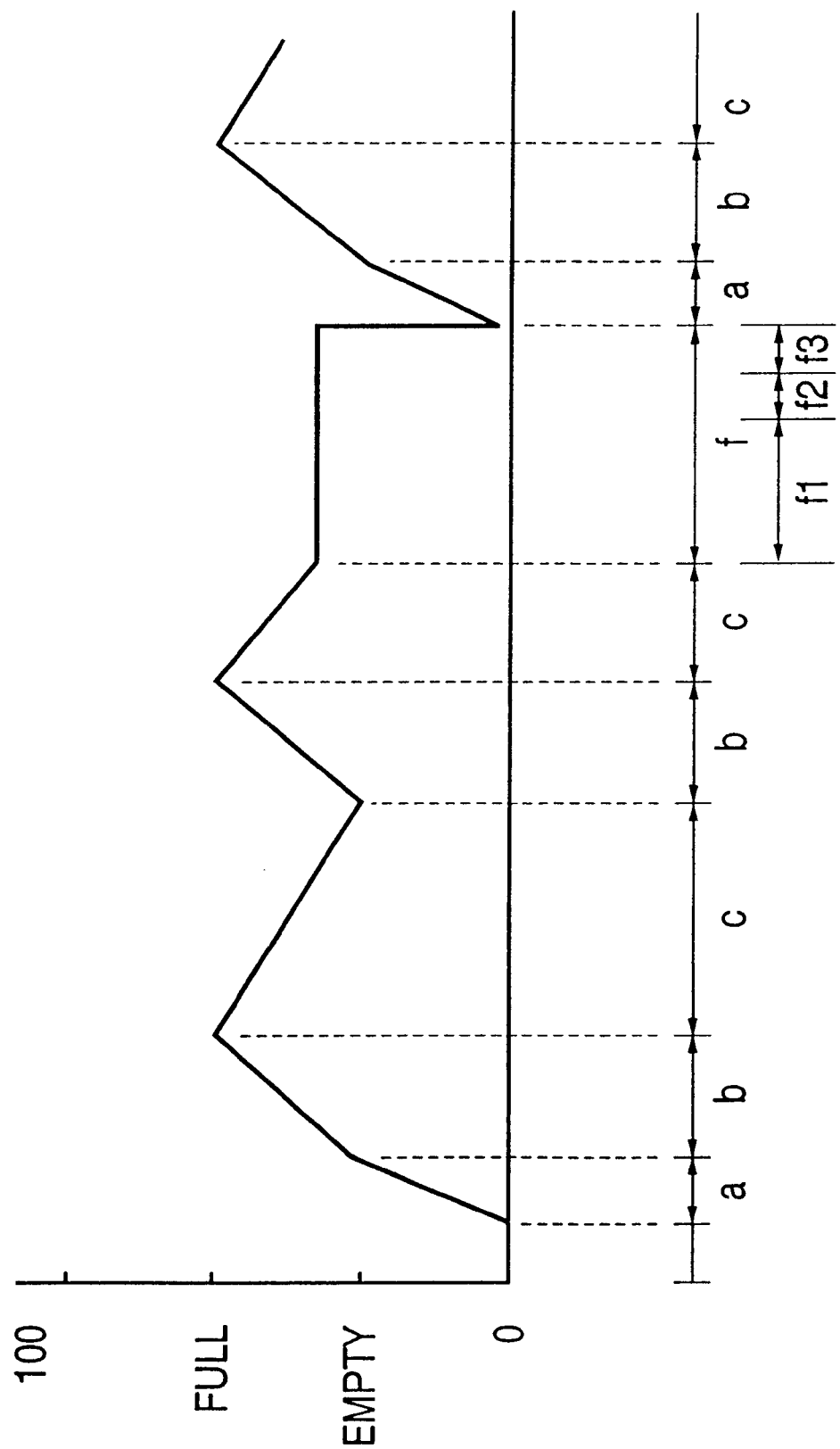
FIG. 19 is a time chart which shows a variation in amount of data stored in a temporal memory in the tenth embodiment.

FIG. 19 shows a variation in amount of data stored in the temporal memory 16 when a highlight command is handled in the playback mode of operation. The full level and the empty level in the drawing do not indicate stored amounts of 100% and 0%, respectively, but values to which preselected margins are added.

Usually, when the highlight command is handled, reproduction of data read out of a given sector of the optical disc 1 terminates in the course of a stage c where the pickup 4 is kicked cyclically, waiting for reproduction of data from the next sector. In a stage f, the controller 27 displays a highlighted image on the monitor in responsive to the highlight command recorded on the optical disc 1 and at the same time, inhibits data from being read out of the temporal memory 16. The controller 27 cuts the supply of power to preselected circuit components until a viewer chooses one of options listed on the highlighted image.

The stages a, b, and c are identical in system operation with the ones shown in FIG. 10.

Figure 20:
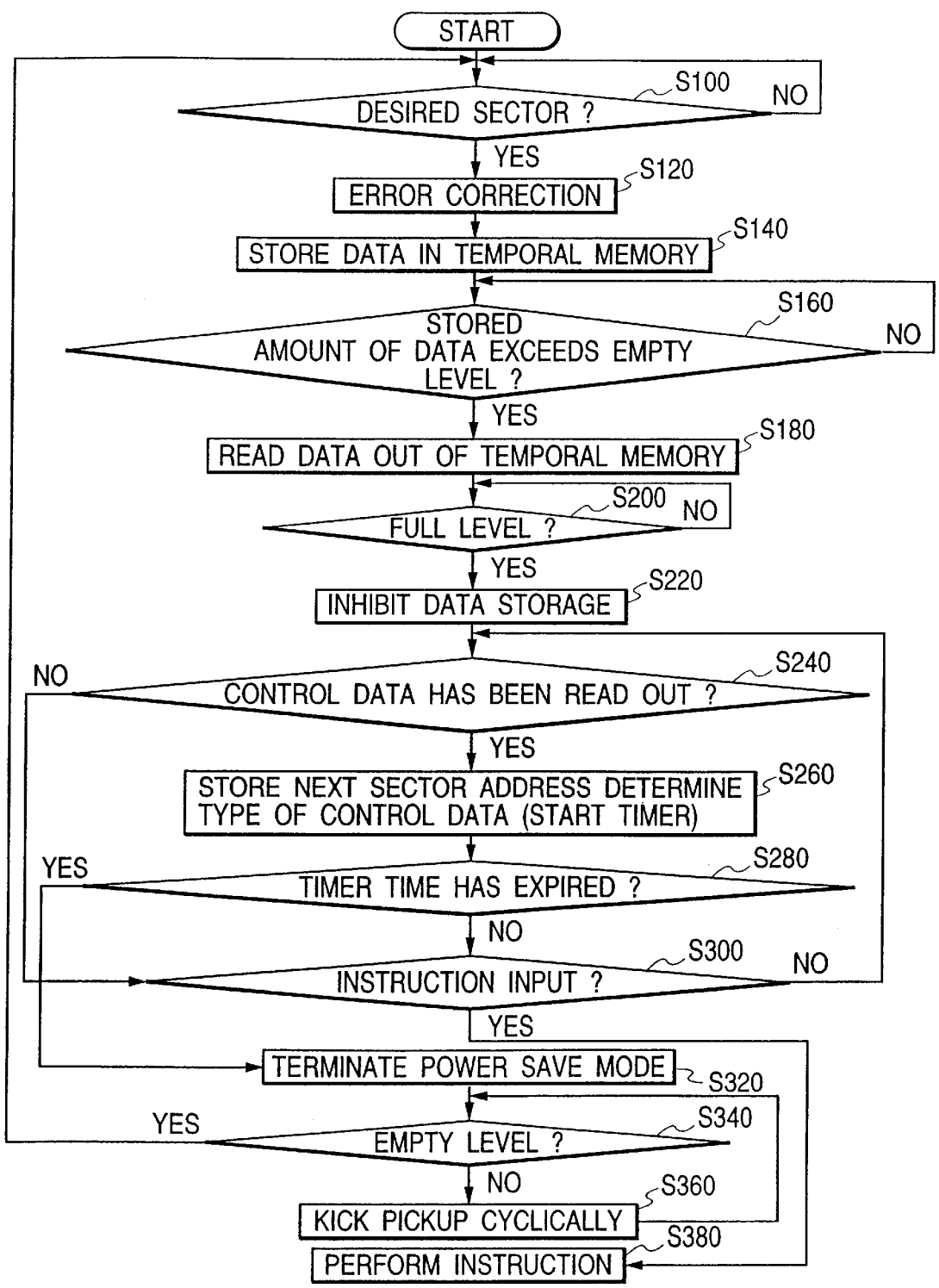
FIG. 20 is a flowchart of a power saving program in the tenth embodiment.

FIG. 20 shows a program or sequence of logical steps performed by the controller 27.

Upon initiation of the playback mode of operation, the routine proceeds to step 100 wherein it is determined whether one of sectors from which reproduction of data is to be started has reached the pickup 4 or not. If a YES answer is obtained, then the reproduction of data is started, and the routine proceeds to step 120 wherein the reproduced data is subjected to error correction. The routine proceeds to step 140 wherein the error-corrected data is stored in the temporal memory 16. The routine proceeds to step 160 wherein it is determined whether a stored amount of data in the temporal memory 16 exceeds the empty level or not. If a YES answer is obtained, then the routine proceeds to step 180 wherein the controller 27 activates the A-V decoder 180 to start to read the data out of the temporal memory 16 and to decompress it. The routine proceeds to step 200 wherein it is determined whether a stored amount of data in the temporal memory 16 has reached the full level or not. If a YES answer is obtained, then the routine proceeds to step 220 wherein the controller 27 inhibits data from being stored in the temporal memory 16.

The routine proceeds to step 240 wherein it is determined whether given control data has been read out of the optical disc 1 or not. If a NO answer is obtained, then the routine proceeds to step 300 wherein it is determined whether a given instruction is inputted or not. If a YES answer is obtained, then the routine proceeds directly to step 380 wherein the given instruction is performed. For instance, the given instruction is to search another title in response to a manual input of the viewer using a key or to cure a failure in operation of the servo system caused by unwanted input of vibration or shock.

If a YES answer is obtained in step 240, then the routine proceeds to step 260 wherein the controller 27 stores an address of one of the sectors of the optical disc 1 from which data is to be read out next and determines the type of the control data. If the control data indicates, for example, a slide show command to display a still image for 20 seconds, the controller 27 sets a count value of a timer to 20 seconds minus 1 second, i.e., 19 seconds, starts the timer (only in the first program cycle), and performs the power save mode, as will be described later in detail.

The routine proceeds to step 280 wherein it is determined whether the count value of the timer has been reached or not. If a NO answer is obtained, then the routine proceeds to step 300. Alternatively, if a YES answer is obtained, then the routine proceeds to step 320 wherein the power save mode is terminated to resume the normal power supply mode.

The routine proceeds to step 340 wherein a stored amount of data in the temporal memory 16 has reached the empty level or not. If a YES answer is obtained, then the routine returns back to step 100. Alternatively, if a NO answer is obtained, then the routine proceeds to step 360 wherein the controller 27 kicks the pickup 4 cyclically to trace one of the track turns of the optical disc 1 which has the sector specified by the sector address stored in step 260.

If it is determined in step 260 that the control data is a highlight command, the controller 27 displays a highlighted image on the monitor in responsive to the highlight command without starting the timer. Subsequently, the controller 27 determines in step 280 whether a viewer has chosen one of options listed on the highlighted image or not.

In the power save mode, the controller 27 must save the power without blocking the servo control and the readout of data from the temporal memory 16. In this embodiment, therefore, the controller 27 cut the supply of power to the signal processor 14 to deactivate the synchronous detection, the EFM+signal-to-NRZ data conversion, the error correction, and the control of data storage in the temporal memory 16 and to the A-V decoder 180 to deactivate the decompression of data. If the control data is the highlight command, it is difficult to estimate the timing with which the viewer will choose one of options listed on the highlighted image. It is, thus, necessary to resume the normal power mode to activate the signal processor 14 and the A-V decoder 180 immediately after the viewer chooses one of the options. Accordingly, the controller 27 keeps the pickup 4 kicked to trace one of track turns having the next sector in the power save mode (i.e., f1 in FIG. 19).

When the viewer chooses one of the options, the controller 27 resumes the supply of power (f2 in FIG. 19) to the signal processor 14 and the A-V decoder 180. The time required to resume the supply of power to activate the signal processor 14 and the A-V decoder 180 is, for example, 1 msec. The pickup 4 seeks one of the track turns of the optical disc 1 from which data is to be reproduced next (f3 in FIG. 19) and starts to read data out of the optical disc 1 (a following f3 in FIG. 19). Image data associated with the other options not chosen by the viewer is read out of the temporal memory 16 so that a stored amount of data is decreased to zero instantaneously (at the end of f3). Subsequently, data associated with the option chosen by the viewer is stored in the temporal memory 16 so that a stored amount of data is increased.

In the power save mode, the controller 27 may also turn off the tracking control while keeping the focus control on. When the tracking control is in the off-state, a beam spot on the optical disc 1 produced by the pickup 4 moves across track turns, so that a complete RF signal is not obtained. A component of the RF signal is, thus, extracted intermittently and used in the CLV control mode of the spindle motor 2 to perform the rough servo control, producing the speed control signal.

The power saving is achieved by cutting the supply of power to a tracking error signal generator in the amplifier 140, a circuit component of the servo circuit 28 which produces a control signal using a tracking error signal, and a tracking circuit of the driver 260.

Upon resumption of the supply of power, the controller 27 turns on the tracking control, reads out the address of one of the sectors of the optical disc 1 from which data is to be reproduced next, and kicks the pickup 4 at regular intervals until the one of the sectors is reached. The time required for the DVD player to return to the normal operation mode completely is about 50 msec.

FIG. 21 shows a variation in amount of data stored in the temporal memory 16 in a case where a slide show command is handled in the playback mode of operation.

It is assumed that reproduction of data read out of a given sector of the optical disc 1 terminates in the course of a stage c while the pickup 4 is kicked cyclically, waiting for the next sector, after which a still image such as a slide picture is displayed in response to the slide show command. In this case, only audio data is reproduced or read out of the temporal memory 16, while image data is stopped from being read out of the temporal memory 16. The speed at which the data is outputted from the temporal memory 16 is decreased greatly (f) in FIG. 21). Assuming that the control data has instructions to display the still image for 20 sec. and to switch the still image to another one in sequence, the supply of power to circuit components which need not operate during reproduction of the still image is cut for 20 sec. minus, for example, 50 msec. required for the DVD layer to return to the normal operation mode completely, i.e., 19.95 sec. The servo control is substantially the same as described above.

In the above case where the slide show command is handled, it is possible to estimate the timing with which the controller 27 should take subsequent action, that is, switch the still image being displayed to another one. The supply of power to the servo system taking much time to return to the normal operation mode may, thus, also be cut. If this recovery time is 50 msec., it is advisable that the supply of power be resumed in f2 at least 50 msec. before the reproduction of one still image terminates.

In the power save mode, the controller 27 may further turn off the focus control, the tracking control, and a laser built in the pickup 4. When the focus and tracking controls are in the off-state, a complete servo signal is not obtained. It is, thus, impossible to operate the spindle motor 2 under the CLV control, and the above described FG control is initiated. Specifically, the controller 27 determines the speed of the FG corresponding to the current one of sectors to keep the FG rotated at the determined speed.

The spindle motor 2 may alternatively be stopped in this power save mode, however, it takes much time to accelerate the spindle motor 2 to a normal speed. It is, thus, preferable that the speed of the spindle motor 2 be kept under the FG control. Under the FG control, the spindle motor 2 may be decreased in speed to half a normal speed or less in order to save more power.

In each power save mode as described above, upon input of any signal to the controller 27, the power supply may be resumed immediately. For instance, the power supply may be resumed upon manual input of a signal for searching a desired portion or the leader of a moving picture or occurrence of an error in reproducing audio or image signals, requiring reproduction of desired data from the optical disc 1 again. The input of the signal and the occurrence of the error may be monitored automatically in the controller 27.

The above described tenth embodiment has referred to the DVD player, however, it may be used with any other optical disc players in which the time required for data to be stored in a buffer or temporal memory up to a full level is relatively long, thus allowing much power save time to be taken such as players which handle control data whose content hardly change for a relatively long period of time such as the highlight command or the slide show command or which reproduce data at lower transfer rates.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An optical recording apparatus comprising:

a temporal memory which stores therein a signal to be recorded on an optical disc which is compressed at a given compression rate;

a data storage monitoring circuit which monitors the amount of the compressed signal stored in said temporal memory and provides a signal indicative thereof;

a pickup which emits light onto the optical disc to record the compressed signal read out of said temporal memory and receives a return of the light from the optical disc to output a signal;

a first servo circuit which produces servo error signals based on the signal outputted from said pickup;

a second servo circuit which is responsive to the servo error signals from said first servo circuit to subject said pickup to focus, tracking, and traverse control;

a power saving circuit which is responsive to the signal from said data storage monitoring circuit to save power supplied to a preselected circuit component of at least one of said first and second servo circuit during a time interval in which the amount of the compressed signal stored in said temporal increases from a first level to a second level; and a single type specifying circuit which specifies a type of the signal to be recorded on the optical disc, and wherein said power saving circuit performs a power saving operation based on the type of the signal specified by the said signal type specifying circuit and determines a timing with which supply and power to the preselected circuit component is resumed based on the type of the signal.

2. An optical recording apparatus as set forth in claim 1, further comprising a disc type specifying circuit which specifies a type of the optical disc, and wherein said power saving circuit performs the power saving operation based on the type of the signal specified by said signal type specifying circuit and the type of the optical disc specified by said disc type specifying circuit and determines the timing with which supply of power to the preselected circuit component is resumed based on the type of the signal and the type of the optical disc.

3. An optical recording apparatus as set forth in claim 1, further comprising a linear velocity determining circuit which determines a linear velocity of the optical disc based on the type of the signal, and wherein said power saving circuit performs the power saving operation and determines the timing with which the supply of power to the preselected circuit component is resumed based on the type of the signal and the linear velocity of the optical disc.

* * * * *